(12) United States Patent
Haider et al.

(10) Patent No.: US 12,182,853 B1
(45) Date of Patent: Dec. 31, 2024

(54) SYSTEMS AND METHODS FOR AND OPERATION OF A DIGITAL MARKETPLACE ADD-IN

(71) Applicant: Wells Fargo Bank, N.A., San Francisco, CA (US)

(72) Inventors: Imran Haider, San Ramon, CA (US); Andrew-An Truong Luu, Berkeley, CA (US); Kumaran Perumal, San Ramon, CA (US); Chad Ironside, Piedmont, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 298 days.

(21) Appl. No.: 17/552,235

(22) Filed: Dec. 15, 2021

(51) Int. Cl.
  *G06Q 30/0601* (2023.01)
  *G06F 21/62* (2013.01)
  *G06Q 20/10* (2012.01)
  *G06Q 20/40* (2012.01)
  *G06Q 40/03* (2023.01)

(52) U.S. Cl.
  CPC ..... *G06Q 30/0641* (2013.01); *G06F 21/6245* (2013.01); *G06Q 20/102* (2013.01); *G06Q 20/4014* (2013.01); *G06Q 20/4016* (2013.01); *G06Q 40/03* (2023.01); *G06Q 2220/00* (2013.01)

(58) Field of Classification Search
  None
  See application file for complete search history.

(56) References Cited

U.S. PATENT DOCUMENTS 5,649,117 A    7/1997  Landry
7,280,981 B2  10/2007  Huang et al.
(Continued)

OTHER PUBLICATIONS

IBM.com, "Learn about software development kits (SDKs) and Application Programming Interfaces (APIs) and how they improve both software development cycles and the end-user experience (UX)," retrieved from https://www.ibm.com/blog/sdk-vs-api/ published on Jul. 13, 2021 (Year: 2021).*
(Continued)

*Primary Examiner* — Patrick McAtee
*Assistant Examiner* — Eduardo Castilho
(74) *Attorney, Agent, or Firm* — Foley & Lardner LLP

(57) ABSTRACT

Systems, methods, and computer-readable storage media for a digital marketplace add-in. One method includes receiving an entity dataset includes marketplace design preferences that define styling and designs of an online marketplace provided by a marketplace computing system, and generating and presenting, on a user device, a first application user interface based on the marketplace design preferences, the first application user interface including a plurality of interactive elements associated with payment information of a user. The method further includes receiving a preference in response to a selection of a first interactive element of the plurality of interactive elements, and receiving, from the marketplace computing system, transaction information regarding a transaction. The method further includes identifying the user based on correlating the transaction information to the user, retrieving the preference based on identifying the user, and automatically routing, a resource to the user based on the retrieved preference.

18 Claims, 12 Drawing Sheets

(56) References Cited

U.S. PATENT DOCUMENTS

| | | | |
|---|---|---|---|
| 7,711,645 B2 | 5/2010 | Morello | |
| 9,111,307 B1* | 8/2015 | Hanni | G06Q 30/0613 |
| 9,911,114 B2 | 3/2018 | Rackley et al. | |
| 10,163,086 B2* | 12/2018 | Keresman, III | G06Q 20/227 |
| 2002/0111886 A1 | 8/2002 | Chenevich et al. | |
| 2004/0230526 A1 | 11/2004 | Praisner | |
| 2006/0206425 A1 | 9/2006 | Sharma | |
| 2007/0078726 A1* | 4/2007 | MacDonald Korth | G06Q 10/06 705/26.1 |
| 2008/0004992 A1* | 1/2008 | King | G06Q 30/0625 705/26.62 |
| 2012/0072314 A1* | 3/2012 | Schory | G06Q 30/06 705/27.2 |
| 2012/0296728 A1* | 11/2012 | Humphreys | G06Q 30/0231 705/14.27 |
| 2013/0073309 A1 | 3/2013 | Ritchie | |
| 2014/0195416 A1 | 7/2014 | Linscott et al. | |
| 2014/0351085 A1* | 11/2014 | Kotas | G06F 8/38 705/26.8 |
| 2014/0358766 A1* | 12/2014 | Nayyar | G06Q 40/03 705/38 |
| 2015/0019292 A1* | 1/2015 | Myllyrinne | G06Q 30/0601 705/7.32 |
| 2015/0286988 A1* | 10/2015 | Ogrinz | G06Q 30/06 705/345 |
| 2016/0071187 A1* | 3/2016 | Bhosle | G06Q 30/0631 705/26.7 |
| 2017/0091722 A1* | 3/2017 | Miyamoto | G06Q 30/0643 |
| 2017/0140374 A1 | 5/2017 | O'Brien et al. | |
| 2017/0178110 A1 | 6/2017 | Swanson et al. | |
| 2017/0213282 A1* | 7/2017 | Dziuk | G06Q 40/03 |
| 2017/0278084 A1* | 9/2017 | Kumra | G06Q 20/12 |
| 2018/0068376 A1* | 3/2018 | Wang | G06Q 20/36 |
| 2018/0232715 A1* | 8/2018 | Continanza | G06Q 20/085 |
| 2018/0308159 A1* | 10/2018 | Knijnik | G06Q 30/0202 |
| 2020/0364746 A1* | 11/2020 | Longano | G06N 20/00 |
| 2020/0380513 A1* | 12/2020 | Phillips | G06Q 30/0613 |
| 2021/0158322 A1* | 5/2021 | Cohn | G06Q 20/4037 |
| 2022/0327166 A1* | 10/2022 | Serrano | G06Q 20/401 |
| 2022/0343407 A1* | 10/2022 | Zhou | G06Q 20/12 |
| 2022/0391872 A1* | 12/2022 | Sharma | G06Q 20/102 |

OTHER PUBLICATIONS

L. Ismanto, A. R. Hendra Suwito and A. N. Fajar, "SOA Integration for E-Marketplace," 2019 International Conference on Computer Science, Information Technology, and Electrical Engineering (ICOMITEE), Jember, Indonesia, 2019, pp. 1-4, doi: 10.1109/ICOMITEE.2019.8921150. (Year: 2019).*

Libby, "Checking Out with the Payment Request API," Springer Science+Business MediaNew York, 2019, ISBN 978-1-4842-5183-6 https://doi.org/10.1007/978-1-4842-5184-3 (Year: 2019).*

Sims, Lisa, "Building Your Online Store With WordPress and WooCommerce," Springer Science+Business MediaNew York, 2018, ISBN 978-1-4842-3845-5, https://doi.org/10.1007/978-1-4842-3846-2 (Year: 2018).*

* cited by examiner

FIG. 4D

Company ABC

Payment Preferences

Prefered Payment Method: Credit Card ▼ — 358, 360

- Auto - Payment: ON/OFF — 362
- Auto - Escrow: ON/OFF — 364
- 401k Contribution: $2000 — 366
- Bank Account #: 101010 — 368
- Routing #: 1234567 — 370
- SSN: *--**** — 372

SECURE COMPONENT

400

SYSTEMS AND METHODS FOR AND OPERATION OF A DIGITAL MARKETPLACE ADD-IN

TECHNICAL FIELD

The present disclosure relates to the field of data protection. More particularly, the present disclosure relates to an add-in for a digital marketplace that protects sensitive data from exposure to, for example, the digital marketplace.

BACKGROUND

Information collected and generated by computing systems can include private, proprietary, or otherwise confidential information. In particular, private, proprietary, or otherwise confidential information can be used when performing exchanges. Storing and transferring such information during the performance of exchanges, such as transactions, can negatively impact privacy and security. For example, fraudsters may obtain sensitive data and subsequently misuse it (e.g., make unauthorized purchases, access user accounts, etc.) during transactions. With the prevalence of ecommerce, the importance of efficient and effective data privacy management has increased given the number of entities/actors that may encounter sensitive information of a user while the user engages in ecommerce activities.

SUMMARY

One embodiment relates to a system including a data protection computing system including at least one processing circuit having at least one processor coupled to at least one memory, the at least one processing circuit configured to: receive an entity dataset including marketplace design preferences that define styling and designs of an online marketplace provided by a marketplace computing system; generate and present, on a user device, a first application user interface based on the marketplace design preferences, the first application user interface including a plurality of interactive elements associated with payment information of a user; receive a preference in response to a selection of a first interactive element of the plurality of interactive elements; receive, from the marketplace computing system, transaction information regarding a transaction; identify the user based on correlating the transaction information to the user; retrieve the preference based on identifying the user; and automatically route a resource to the user based on the retrieved preference.

In some arrangements, the first application user interface is provided by the data protection system. The first application user interface may be a component import of a native webpage hosted by the marketplace computing system. In various arrangements, the component import includes a software development kit. In some arrangements, the at least one processing circuit is further configured to: establish a connection between the least one processing circuit and the user device, and wherein the first application user interface depicts at least one of payment card industry (PCI) data, banking data, or personal identifiable information (PII). In various arrangements, the at least one processing circuit and the user device exchange information utilizing a first application programming interface (API), and wherein the at least one processing circuit and the marketplace computing system exchange information utilizing a second application programming interface (API). In some arrangements, the at least one processing circuit is further configured to: determine a response associated with a timeframe based on the entity dataset; and determine a lending rate for an amount of funds based on the determined response. In various arrangements, the at least one processing circuit is further configured to: update, on the user device, the first application user interface to include a second interactive element associated with an offer including the lending rate for the amount of funds. In some arrangements, the at least one processing circuit is further configured to: determine a fee on the transaction; deduct the fee from a payment of the transaction; and store the fee in an account of the user in a data protection database. In various arrangements, the at least one processing circuit is further configured to: receive, from the user device, an activation condition, wherein the first application user interface is presented in response to receiving the activation condition; receive, from the user device, a user identifier and a credential; register the user with the data protection system, wherein registering including generating a profile for the user including the preference, the user identifier, the credential, and the activation condition; and store the profile in a data protection database. In some arrangements, the marketplace design preferences include styling information of the marketplace computing system, wherein the styling information includes one or more libraries or one or more frameworks for styling the plurality of interactive elements, and wherein the at least one processing circuit is further configured to: in response to receiving receive the preference, store, in a data protection database, the preference; update the styling information to include the preference, wherein the updated styling information includes an offer associated with a payment method; and generate and configure the first application user interface based on the one or more libraries or one or more frameworks. In various arrangements, the at least one processing circuit is further configured to: generate user analytics based on historical response information of the user; and present, on the user device, the user analytics.

Another embodiment relates to a computer-implemented method for a digital marketplace add-in. The method includes: receiving, by one or more processing circuits, an entity dataset including marketplace design preferences that define styling and designs of an online marketplace provided by a marketplace computing system; generating and presenting, by the one or more processing circuits on a user device, a first application user interface based on the marketplace design preferences, the first application user interface including a plurality of interactive elements associated with payment information of a user; receiving, by the one or more processing circuits, a preference in response to a selection of a first interactive element of the plurality of interactive elements; receiving, by the one or more processing circuits from the marketplace computing system, transaction information regarding a transaction; identifying, by the one or more processing circuits, the user based on correlating the transaction information to the user; retrieving, by the one or more processing circuits, the preference based on identifying the user; and automatically routing, by the one or more processing circuits, a resource to the user based on the retrieved preference.

In some arrangements, the first application user interface is provided by the one or more processing circuits. Further, the first application user interface may be a component import of a native webpage hosted by the marketplace computing system. In some arrangements, the computer-implemented method further includes: establishing, by the one or more processing circuits, a connection between the one or more processing circuits and the seller device, and wherein the first application user interface depicts at least one of payment card industry (PCI) data, banking data, or personal identifiable information (PII), wherein the one or more processing circuits and the user device exchange information utilizing a first application programming interface (API), and wherein the one or more processing circuits and the marketplace computing system exchange information utilizing a second application programming interface (API). In various arrangements, the marketplace design preferences include styling information of the marketplace computing system, wherein the styling information includes one or more libraries or one or more frameworks for styling the plurality of interactive elements. In some arrangements, the computer-implemented method further includes: in response to receiving the preference, storing, by the one or more processing circuits in a data protection database, the preference; and updating, by the one or more processing circuits, the styling information to include the preference, wherein the updated styling information includes an offer associated with a payment method.

Still another embodiment relates to one or more non-transitory computer-readable storage media having instructions stored thereon that, when executed by at least one processing circuit, cause the at least one processing circuit to: receive an entity dataset including marketplace design preferences that define styling and designs of an online marketplace provided by a marketplace computing system; generate and present, on a user device, a first application user interface based on the marketplace design preferences, the first application user interface including a plurality of interactive elements associated with payment information of a user; receive a preference in response to a selection of a first interactive element of the plurality of interactive elements; receive, from the marketplace computing system, an indication of a transaction; identify the user based on correlating the transaction information to the user; retrieve the preference based on identifying the user; and automatically route a resource to the user based on the retrieved preference.

In some arrangements, the first application user interface is provided by the at least one processing circuit, and the first application user interface is a component import of a native webpage hosted by the marketplace computing system. In various arrangements, the one or more computer-readable storage media, have additional instructions stored thereon that, when executed by the at least one processing circuit, cause the at least one processing circuit to: establish a connection between the least one processing circuit and the user device, and the first application user interface depicts at least one of payment card industry (PCI) data, banking data, or personal identifiable information (PII). Further, the at least one processing circuit and the user device exchange information utilizing a first application programming interface (API), and the at least one processing circuit and the marketplace computing system exchange information utilizing a second application programming interface (API).

BRIEF DESCRIPTION OF THE FIGURES

FIG. 4A-4D are example graphical user interfaces depicting a registration interface, according to some arrangements.

Figure 1:
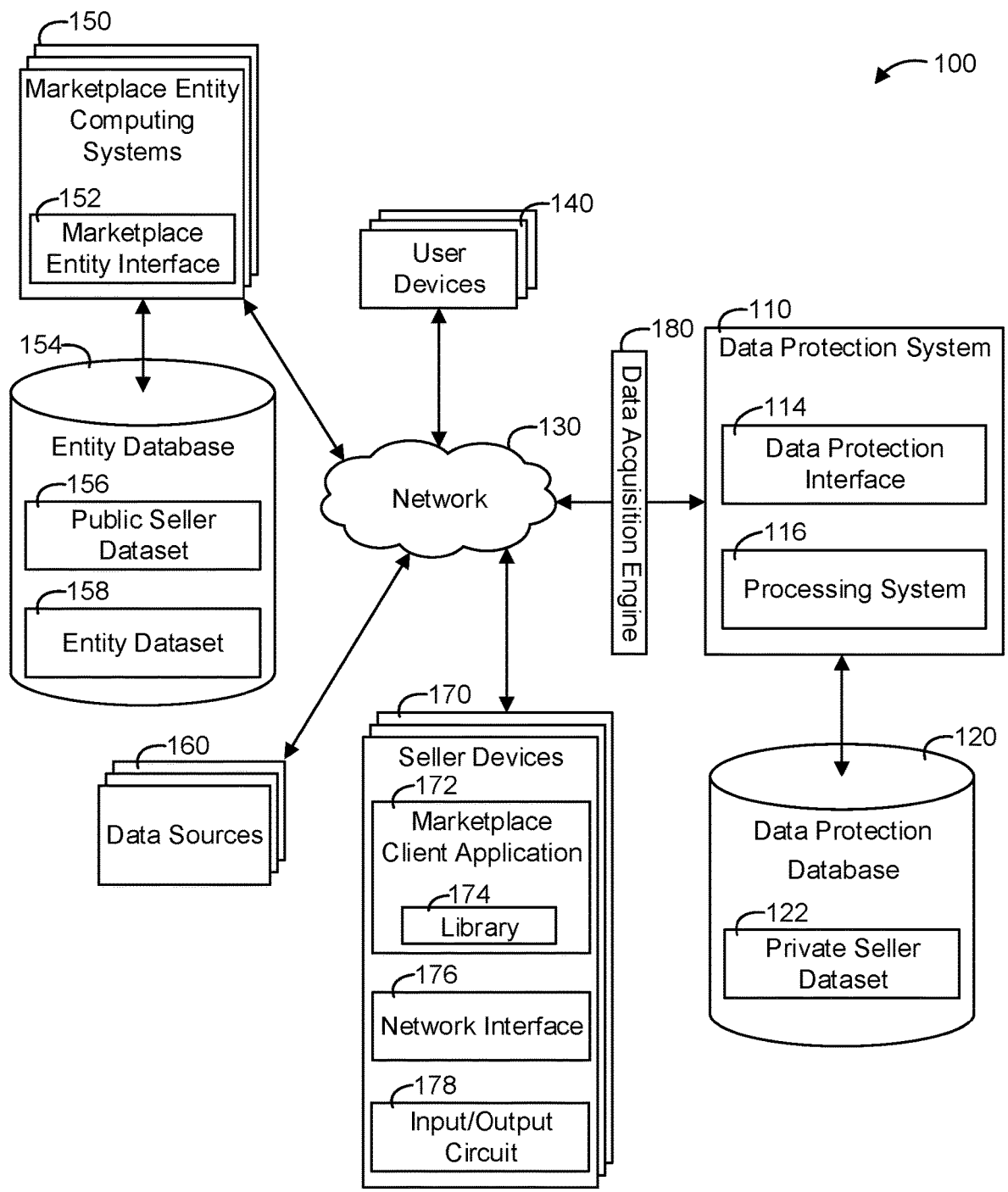
FIG. 1 is a block diagram depicting an example of a data protection computing system and environment, according to some arrangements.

It will be recognized that some or all the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the Figures, the systems, apparatuses, and methods disclosed herein relate to protecting data. In many systems, sensitive data can be collected, stored, and generated through everyday business interactions (e.g., transactions, registrations, marketing, and so on). In particular, sensitive data (e.g., deoxyribonucleic acid (DNA), social security numbers (SSN), passport number, financial account numbers, payment card industry (PCI) data, other personal identifying information, and so on) can be collected, stored, and generated in computer networked environments of various entities (e.g., via a mobile application, webpage, point-of-sale, and so on). Oftentimes, the computer networked environments of various connected entities have weak security and privacy controls, and the collecting, storing, and generating of sensitive data can pose a risk to exposure and compromise (e.g., a cyber-incident). Further, maintaining and protecting the sensitive data by various entities can inhibit and restrict computing systems to perform certain tasks (e.g., perform addition business interactions) due to concerns of accidentally exposing the sensitive data. Accordingly, the ability to avoid and prevent cyber threats, such as hacking activities, data breaches, and cyberattacks is desired.

As described herein, instead of a digital marketplace computing system collecting, storing, and generating sensitive data natively on the digital marketplace computing system, a data protection system as described herein can establish a secure connection to present a first application user interface that can be a component import of a native webpage (or application) of the digital marketplace. Thus, the data protection system can collect, store, and generate the sensitive data without the digital marketplace computing system interacting with the sensitive data thereby shielding the data and alleviating its exposure to the digital marketplace. The causal design and execution of protecting sensitive data helps reduce and/or eliminate the processing load digital marketplace computing systems have when attempting to stop cyber-incidents. The causal approach to protecting sensitive data provides significant improvements to cybersecurity of digital marketplaces and users by improving network security (e.g., the computer networked environment of the digital marketplace does not include sensitive data), infrastructure security (e.g., parties may not attempt to gain unauthorized access if they know they do not collect, store, or generate sensitive data), technology security (e.g., eliminate data silos that are susceptible to cyber-incidents (i.e., reduce "attack surface")), and data security (e.g., data centralization improves analytical reporting, data governance, maintaining). By using a first application user interface via a component import, aspects of this technical solution can eliminate the exposure of sensitive data over the network and in the computer networked environments of the digital marketplace, which is a significant improvement over other data protection architectures. This not only protects sensitive data from compromise, but also protects entities from exposure, which is a significant improvement to the security of computing systems.

In some implementations, a seller device (e.g., vendor, service provider, merchant) may provide payment information to an online or digital marketplace hosted by a marketplace entity (e.g., the online marketplace of Etsy®, Amazon®, Facebook® Marketplace, Fiverr®, etc.). The marketplace entity may be a company or institution associated with a marketplace entity computing system that can be configured to host an online marketplace for third-parties to provide services and products for sale. Further, the seller may be a company or institution associated with the seller device that can be configured to communicate with the online marketplace and provide payment information to receive a payment upon a sale of a product or service on the online marketplace. The payment information may include, but is not limited to, preferred payment methods, auto-payment settings, auto-escrow settings, 401k contribution allocations, bank account numbers, routing numbers, PCI data, and so on. In one example, the seller may sell a product and/or service on/via the online marketplace. In this example, unlike in traditional systems where the marketplace entity would collect and route the payment to the seller based on payment information stored in a database managed by the marketplace entity, the data protection system described herein can receive an indication of a transaction and in response, route the payment to one or more accounts of the seller (e.g., bank account (checking or savings), escrow account, money market account, individual retirement arrangement (IRA), certificate of deposit (CD), retirement account, and so on). Accordingly, instead of the marketplace entity computing system processing transactions, the data protection system can collect (e.g., via a secure connection), store (e.g., in a centralization repository), and generate the sensitive data (e.g., payment processing information such as, but not limited to, PCI data, financial account number, and other personal identifying information) without the marketplace computing system or the computer networked environment of the marketplace interacting with the sensitive data.

In various implementations, the seller device can establish a secure connection with the data protection system during registration with an online marketplace provided by the marketplace entity. For example, for company ABC to sell product X on marketplace Y, company ABC may first be required to register with marketplace Y such that product X can be presented on marketplace Y for sale. In this example, during registration, company ABC can establish a secure connection such that the data protection system can present a first application user interface to register their payment information (also referred to as payment preferences) such that when a sale occurs on marketplace Y, the data protection system can route payment correctly. In various implementations, the payment preferences may be inaccessible to the marketplace having control over the online marketplace. Accordingly, the data protection architecture described herein enables entities to continue to operate marketplaces without collecting, storing, or generating sensitive data, thereby improving data protection architectures.

As used herein, a "cyber-incident" may be any incident where a party (e.g., user, individual, institution, company) gains unauthorized access to perform unauthorized actions in a computer network environment. A cyber-incident may result from a cybersecurity vulnerability. In many systems, cybersecurity vulnerabilities (e.g., malware, unpatched security vulnerabilities, expired certificates, hidden backdoor programs, super-user and/or admin account privileges, remote access policies, other policies and procedures, type and/or lack of encryption, type and/or lack of network segmentation, common injection and parameter manipulation, automated running of scripts, unknown security bugs in software or programming interfaces, social engineering, and IoT devices) can go undetected and unaddressed, leading to hacking activities, data breaches, cyberattacks (e.g., phishing attacks, malware attacks, web attacks, and artificial intelligence (AI)-powered attacks), and/or other detrimental cyber-incidents.

Referring now to FIG. 1, a block diagram depicting an example of a data protection system 110 within a computing environment or system 100, is shown, according to an illustrative implementation. As shown, the environment 100 comprises the data protection system 110, which includes data protection database 120. The data protection system 110 is coupled, via the data acquisition engine 180, to a plurality of devices and/or systems including, user devices 140, marketplace entity computing systems 150, data sources 160, and seller devices 170. The plurality of devices and/or systems 140, 150 and 170, and/or the data sources 160 may initiate and/or route (e.g., provide) data, information, etc. over a network 130. The data acquisition engine 180 may provide a single application programming interface (API) or multiple APIs to access various data generated, stored, or routed by devices and systems 140, 150 and 170, and/or by the data sources 160.

The one or more user devices 140 (e.g., smartphones, tablets, computers, etc.) may be associated with (e.g., owned by, associated with, or otherwise used by) a user to perform various actions and/or access various types of content (e.g., the online marketplace described herein), some of which may be provided over a network 130. As used herein, the "user" refers to a person operating the user device 140 who interacts with resources or marketplaces via the user device 140. In one embodiment, the user may be a customer of the digital marketplace (e.g., a purchaser or buyer). The user device 140 may be used to send data to the data protection system 110 or may be used to access websites (e.g., using an internet browser), access applications (e.g., using a mobile application), and/or any other types of content. In some implementations, the user device 140 has enabled location services which can be tracked over network 130. Locations services may use GPS or other technologies to determine a location of user devices 140.

The network 130 may include a local area network (LAN), a wide area network (WAN), a telephone network, such as the Public Switched Telephone Network (PSTN), a wireless link, an intranet, the Internet, or combinations thereof. The network 130 can enable communication between various nodes, such as the data protection system 110 and user devices 140. In some arrangements, data flows through the network 130 from a source node to a destination node as a flow of data packets, e.g., in the form of data packets in accordance with the Open Systems Interconnection (OSI) layers. A flow of packets may use, for example, an OSI layer-4 transport protocol such as the User Datagram Protocol (UDP), the Transmission Control Protocol (TCP), or the Stream Control Transmission Protocol (SCTP), transmitted via the network 130 layered over an OSI layer-3 network protocol such as Internet Protocol (IP), e.g., IPv4 or IPv6. The network 130 is composed of various network devices (nodes) communicatively linked to form one or more data communication paths between participating devices. Each networked device includes at least one network interface for receiving and/or transmitting data, typically as one or more data packets. An illustrative network 130 is the Internet; however, other networks may be used. The network 130 may be an autonomous system (AS), i.e., a network that is operated under a consistent unified routing policy (or at least appears to from outside the AS network) and is generally managed by a single administrative entity (e.g., a system operator, administrator, or administrative group).

The one or more marketplace entity computing systems 150 may be associated with (e.g., owned by or otherwise associated with) a marketplace entity. As used herein, the "marketplace entity" refers to a company or other entity that hosts an online marketplace with one or more individuals operating the marketplace entity computing systems 150 and interacting with resources or data via the entity computing systems 150. For example, the entity may host a business-to-business marketplace (B2B), a business-to-consumer marketplace (B2C), a peer-to-peer marketplace (P2P), and so on. In the example shown, the marketplace offers one or more products and/or services for sale. The marketplace entity computing system 150 may be used to perform various actions and/or access various types of data, some of which may be provide over network 130. The marketplace entity computing systems 150 may be used to send data (e.g., exchange information) to the data protection system 110, or may be used to provide (or present) a marketplace interface (e.g., via the entity interface 152) to the seller devices 170 and user devices 140. The marketplace entity computing systems 150 can include one or more processing circuits or systems that have one or more processors coupled to one or more transitory and/or non-transitory storage mediums and/or memory devices (e.g., any computer-readable storage media, such as a magnetic storage, optical storage, flash storage, RAM, and so on). Thus, the one or more processing circuits or systems may have the same or similar definition and configuration as the processing system 116 of the data protection system described herein below.

In some arrangements, each marketplace entity computing system 150 can host an individual online marketplace specific to the entity. For example, entity A may host marketplace J that is a marketplace for services sold by third-parties. In another example, entity B may host marketplace K that is a marketplace for goods sold by third-parties. In yet another example, entity C may host marketplace L that is marketplace for goods and services sold by entity C. In this example, entity C would be the seller of all goods and services on marketplace L. Furthermore, in this example, entity C can still provide sensitive data (e.g., payment preferences) to data protection system 110 such that entity C does not store, collect, or generate sensitive data on computer networked environments and thus, improving network security, infrastructure security, technology security, and data security of the entity.

The marketplace entity interface 152 is an interface generator that is configured to generate and provide one or more graphical user interfaces (GUIs) to one or more computing devices (e.g., user devices 140, seller devices 170, and/or data protection system 110) for presentation. That is, the provided GUIs can execute and/or be displayed at the computing devices described herein. In some arrangements, the GUIs can be provided within a web browser or a mobile application. In various arrangements, the marketplace entity interface 152 interacts with a seller to receive online content and/or network content. For example, the marketplace entity interface 152 may receive information for products and services from a seller. The information may include web-based marketplace items such as one or more photographs of items the seller desires to sell and/or other item material (e.g., descriptions, warranties, sale price, discount price). In some arrangements, the received information can be stored in the public seller dataset 156 (e.g., sorted by seller). The marketplace entity computing system 150 may include instructions (e.g., scripts, executable code, etc.) that when interpreted by the marketplace entity interface 152 cause one or more GUIs on the one or more computing devices described herein. As mentioned above, the GUIs may be provided as one or more an interactable web pages. In another embodiment, the GUIs are generated and packaged into a mobile application accessible to a user (e.g., marketplace interface). Thus, the marketplace entity interface 152 can include one or more application interfaces for presenting an application (e.g., mobile application, web-based application, virtual reality/augmented reality application, smart TV application, and so on).

In some arrangements and in addition to the GUI generator capability, the marketplace entity interface 152 tracks and reports metrics or other analytics. For example, the marketplace entity interface 152 may transmit metrics associated with activity associated with the online marketplace. The metrics may include, but are not limited to, a total sales, total revenue (e.g., per product, per brand, overall), errors with one or more products and/or services on the marketplace, return requests from buyers, tax allocations, products/services offered by the online marketplace, seller information (e.g., email information, address information, name information, etc.) of the products or services offered, reviews and ratings, fees, product or service, invoice or order defect rate, fulfilment performance, inventory performance, and so on. In various arrangements, the marketplace entity interface 152 includes information associated with a marketplace client application 172 (which as described herein, attributes and configuration parameters stored in library 174). For example, the entity interface 152 may include a version number of the marketplace client application 172.

The one or more data sources 160 may be one or more computing systems configured to provide and store data to requesting parties. The data sources 160 may be third-parties relative to the marketplace computing system 150 and the data protection system 110. The one or more data sources 160 can include data collected by various, such as the data protection system 110 (e.g., interaction data, such as transactions, registrations, point-of-sale communications), marketplace computing systems 150, user devices 140, and/or other entities/systems. The data may be transaction information (e.g., revenue, receipts, profits) for particular products and/or services (e.g., product A sold by seller J, product B sold by seller K, product C sold by seller L) at one or more points in time (e.g., from a marketplace during a predefined time period, a date range, etc.). The data may be data for particular entities, third-parties, or users (e.g., patients, customer purchases, internet ads, historical revenue) at one or more points in time or windows of time. The data collected may associated with a plurality of entities, a plurality of users, a plurality of third-parties a specific entity, a specific user, a specific seller, and so on. Data sources 160 may also be various data aggregating systems and/or entities that collect interaction data. The data protection system 110 can receive interaction data from the data sources 160 via the network 130. This information may be stored as interaction data in the private seller dataset 122.

The one or more seller devices 170 may be associated with (e.g., owned or otherwise associated with and used by) a seller. The seller may have a relationship to the marketplace entity (e.g., provider, vendor, supplier, business partner, and so on). The seller device 170 may be configured to perform various actions and/or access various types of data, some of which may be provided over network 130. As used herein, the "seller" refers to a party that provides products and services on an online marketplace. The third party can be an individual, representative of a company, and/or other operators of the one or more seller devices 170, interacting with resources or data via the seller devices 170. In some arrangements, the third parties can be an organization's partner institutions and/or vendors.

The seller devices 170 may be used to electronically transmit data (e.g., sensitive data) to the data protection system 110 (and other systems of FIG. 1), to access websites (e.g., using a browser), the internet (e.g., using a mobile application), supply services, supply products, and to receive and/or transmit any other types of data. For example, a seller can be a product vendor who, during registration with the online marketplace, may provide sensitive data (e.g., payment preferences) to the data protection system 110, in particular, to the data protection interface 112 via the data acquisition engine 180. Additionally, in the following example and during registration, the third party (e.g., seller) may also provide product data (e.g., pictures of products, prices, details of products) to the marketplace entity computing system 150, in particular, via the marketplace client application 172.

The seller device 170 (sometimes referred to herein as a "computing system") may be a mobile computing device, desktop computer, smartphone, tablet, smart watch, smart sensor, or any other device configured to facilitate receiving, displaying, and interacting with content (e.g., web pages, mobile applications, etc.). Seller device 170 may include a marketplace client application 172 configured to receive and display online content and to receive user interaction with the online content. For example, marketplace client application 172 may be a web browser. Additionally or alternatively, marketplace client application 172 may be a mobile application associated with a specific entity. Seller device 170 may also include a network interface 176 for communicating data over network 130 (e.g., receive and transmit to data protection system 110 and/or entity computing systems 150). The marketplace client application 172 can include computer-executable code stored in the memory of seller device 170.

The seller device 170 can include a network interface 176 that is structured to send and receive communications over network 130 (e.g., with the data protection system 110 and/or entity computing systems 150). The network interface 176 is structured to exchange data (e.g., bundled event logs, content event logs, interactions), communications, instructions, etc. with an input/output component of the various systems and devices described herein. In one implementation, the network interface 176 includes communication circuitry for facilitating the exchange of data, values, messages, and the like between the network interface 176 and the data protection system 110 and/or marketplace entity computing systems 150. In yet another implementation, the network interface 176 includes machine-readable media for facilitating the exchange of information between the network interface 176 and the data protection system 110 and/or entity computing systems 150. In yet another embodiment, the network interface 176 includes any combination of hardware components, communication circuitry, and machine-readable media.

In some arrangements, the seller device 170 can include an input/output circuit 178 that includes suitable input/output ports and/or configured to use an interconnect bus (not shown) for interconnection with a local display (e.g., a touchscreen display) and/or keyboard/mouse devices (when applicable), or the like, thereby serving as a local user interface for programming and/or data entry, retrieval, or other user interaction purposes. As such, the input/output circuit 178 may provide an interface for the user to interact with various applications (e.g., marketplace client application 172) stored on the seller device 170. For example, the input/output circuit 178 may include a keyboard, a keypad, a mouse, joystick, a touch screen, a microphone, a haptic sensor, a sensor, an IoT sensor, a biometric sensor, an accelerometer sensor, a virtual reality headset, smart glasses, smart headsets, and the like. As another example, input/output circuit 178, may include, but is not limited to, a television monitor, a computer monitor, a printer, a facsimile, a speaker, and so on. As used herein, virtual reality, augmented reality, and mixed reality may each be used interchangeably yet refer to any kind of extended reality, including virtual reality, augmented reality, and mixed reality.

In various arrangements, input/output circuit 178 of the seller device 170 can receive user input from a user (e.g., via sensors, a touchscreen input, or any other input/output devices/ports described herein). A user input can be a plurality of inputs, including by not limited to, a gesture (e.g., a flick of seller device 170, a shake of seller device 170, a user-defined custom inputs (e.g., utilizing an API), biological data (e.g., stress level, heart rate, hand geometry, facial geometry, psyche, and so on) and/or behavioral data (e.g., haptic feedback, gesture, speech pattern, movement pattern (e.g., hand, food, arm, facial, iris, and so on), or combination thereof, etc. In some embodiments, one or more user inputs can be utilized to perform various actions on seller device 170. For example, a user that performs an input may invoke a preferences interface associated with library 174 (also as described in detail with references to FIGS. 3A-3E and 4A-4D).

In various arrangements, network interface 176 can transmit data periodically. For example, network interface 176 may transmit data at a predefined time. As another example, network interface 176 may transmit data on an interval (e.g., every ten minutes, every ten hours, etc.). Additionally or alternatively, network interface 176 may transmit data in response to a threshold. For example, network interface 176 may transmit data in response to marketplace client application 172 receiving a threshold number of event logs from events (e.g., ten events, one-hundred events, etc.). In some implementations, network interface 176 transmits data dynamically. For example, network interface 176 may transmit data in response to user device 140 being connected to a charging source. As a further example, network interface 176 may transmit data in response to the transmission bundle reaching a specified data size (e.g., one megabyte, one gigabyte, etc.).

The marketplace client application 172 is shown to include a library 174. The library 174 is structured as a repository that may store or hold one or more of software development tools contained in a package (e.g., one or more software development kits (SDKs), application programming interfaces (APIs), integrated development environment (IDEs), debugger(s), etc.). For example, library 174 may include an API configured for communication with data protection system 110, in particular, data protection interface 112. In another example, library 174 may include a debugger. In yet another example, the library 174 may be an SDK that includes an API, a debugger, and IDE, and so on. In some implementations, library 174 includes one or more libraries having reusable functions that interface with a particular system software (e.g., iOS, Android, Linux, etc.). Library 174 may facilitate embedding functionality in marketplace client application 172. For example, a seller may use library 174 to automatically transmit (e.g., via a secure connection) sensitive data whenever an event for registration occurs on marketplace client application 172.

As a further example, library 174 may include a reusable function configured to collect and report analytics associated with a marketplace such that it can be inserted into the instructions of marketplace client application 172 to cause the reusable function to be called during specific actions of marketplace client application 172 (e.g., during transactions, during registrations, etc.). Analytics can include data regarding the interactions with the marketplace client application 172 (e.g., requests, response time, page views, load performance, time spent, last clicks, types of interactions) and/or device data regarding the seller device 170 (e.g., errors, exceptions, internet speed, host diagnostics, trace logs, dependency rates), and/or other performance statistics and trends associated with the marketplace client application 172 and/or seller device 170. For example, the marketplace client application 172 may track a number of transactions over a predefined time period by the seller, price information for the transactions, information regarding buyers (e.g., locations thereof), and other information regarding the user's interaction with the digital marketplace. In particular, analytics can be collected by the marketplace client application 172, from the data sources 160, and/or seller device 170. For example, the marketplace client application 172 may continuously receive and/or generate analytics (e.g., in real-time or near real-time) (e.g., every minute, every hour, every day, etc.). The tracked information may be provided to the data protection computing system 110 and/or marketplace computing system 150 to perform predictive analytics, which may include, but are not limited to, an estimated number of transactions in forward forecast region, an average price for each transaction, and so. Alternatively, the predictive analytics may be performed by the marketplace client application 172 using, for example, one or more stored formulas, processes, etc. (e.g., a predictive function).

In some arrangements, the analytics can be used to generate reports, by the marketplace client application 172, data computing system 110, and/or marketplace computing system 150, that can be presented on the seller device 170 via graphs, tables, interactive metrics, charts, and/or other data visualizers. In one embodiment, the marketplace entity computing system 150 executes operations to provide the reports to the marketplace client application 172 and/or data protection system 110. In various arrangements, the marketplace client application 172 can be provided within a client application (e.g., mobile application, desktop application). The marketplace client application 172 from which the marketplace computing system 150 hosts may be provided (e.g., downloaded, or via a webpage) to one or more third-parties and/or users, via the network 130. Additional details relating to the functions of the marketplace client application 172 and the library 174 are described in detail with reference to FIGS. 3A-3E and 4A-4D.

In an example implementation, the marketplace client application 172 can be executed (e.g., downloaded for a mobile-based application) and/or presented (e.g., via a website for a web-based application) by the seller device 170 that can cause preferences to be provided on a GUI on the seller device 170. For example, the seller may perform a gesture (e.g., input) and/or selection (e.g., from a selectable element) on the seller device 170 to invoke the marketplace client application 172. In response, the marketplace client application 172 may request data, such as non-sensitive seller preferences stored in the marketplace database 155 or sensitive seller preferences stored in the data protection database 120. For example, upon the request the seller device 170 may present preferences associated with one or more goods and/or services of the marketplace and allow selection, in real-time, to make modification to one or more preferences (e.g., price change for a service, a model number of good, updated photographs of the good, and so on). In another example, upon the request to modify payment preferences, the seller device 172 may establish a secure connection with the data protection system 110, and in particular, the data protection interface 112.

In another example implementation, the marketplace client application 172 executed by the seller device 170 can cause a web browser (e.g., Safari®, Internet Explorer or Edge, etc.) to launch and display the marketplace on the seller device 170. For example, the user may connect to a website structured to host the marketplace. In various implementations, hosting the marketplace can include infrastructure such as, but not limited to, host devices (e.g., entity computing systems 150) and a collection of files defining the marketplace and stored on the host devices (e.g., entity database 154). The web browser operates by receiving input of a uniform resource locator (URL) into a field from an input device (e.g., a pointing device, a keyboard, a touchscreen, mobile phone, or another form of input device). In response, the marketplace client application 172 providing the marketplace in the web browser may request data such as marketplace data or seller data from marketplace database 154. The web browser may include other functionalities, such as navigational controls (e.g., backward and forward buttons, home buttons). In some implementations, the marketplace can include both a client-side interface and a server-side interface. For example, a client-side interface can be written in one or more general purpose programming and can be executed by seller device 170. The server-side interface can be written, for example, in one or more general purpose programming languages and can be executed by the entity computing system 150. Additional details associated with the marketplace are described in detail with reference to example FIGS. 3A-3E and 4A-4D.

The computing environment 100 is shown to include a data acquisition engine 180. In various arrangements, the data protection system 110 can be communicatively and operatively coupled to the data acquisition engine 180. In other embodiments, the data acquisition engine 180 can be included with the data protection system 110. The data acquisition engine 180 can include one or more processing circuits configured to execute various instructions. In various arrangements, the data acquisition engine 180 can be configured to facilitate communication (e.g., via network 130) between the data protection system 110, the data protection database 120, and systems and devices described herein (e.g., user devices 140, entity computing systems 150, data sources 160, seller devices 170). The facilitation of communication can be implemented as an application programming interface (API) (e.g., REST API, Web API, customized API), batch files, SDK, and/or queries. In various arrangements, the data acquisition engine 180 can also be configured to control access to resources of the data protection system 110 and data protection database 120.

The API can be used by the data acquisition engine 180 and/or computing systems to exchange data and make function calls in a structured format. The API may be configured to specify an appropriate communication protocol using a suitable electronic data interchange (EDI) standard or technology. The EDI standard (e.g., messaging standard and/or supporting technology) may include any of a SQL data set, a protocol buffer message stream, an instantiated class implemented in a suitable object-oriented programming language, an XML file, a text file, an Excel file, a web service message in a suitable web service message format (e.g., representational state transfer (REST), simple object access protocol (SOAP), web service definition language (WSDL), JavaScript object notation (JSON), XML remote procedure call (XML RPC)). As such, EDI messages may be implemented in any of the above or using another suitable technology.

The data protection system 110 may include one or more processing circuits having one or more memory devices storing, computer-readable instructions executable by one or more processors (e.g., ASICs, logic circuits, etc.) configured to perform various functions of the data protection system 110. The data protection system 110 may be owned by, controlled by, managed by, and/or otherwise associated with a provider institution. The provider institution may be a financial institution, such as a credit card issuer, a bank, a payment processing system, etc. The data protection system 110 may be or include a data protection interface 112 and a processing system 114. It should be understood that various implementations may include more, fewer, or different systems than illustrated in FIG. 1, and all such modifications are contemplated within the scope of the present disclosure.

The data protection interface 112 is configured as an interface for the data protection system 110 to various other external computing systems and devices in order to receive data (e.g., entity data, seller data, transaction data) from a plurality of data sources (e.g., data protection database 120, user devices 140, marketplace entity computing systems 150, data sources 160, and seller devices 170) via one or more data channels (e.g., over network 130). Each data channel may include a network connection (e.g., wired, wireless, cloud, a combination thereof) between the data sources and the data protection system 110. For example, the data protection interface 112 may receive marketplace entity data from the marketplace entity computing system 150 including, but not limited to, marketplace design preferences to imitate or reproduce the look (e.g., typefaces, colors, shapes, logos, graphics) and feel (e.g., behavior of elements such as, but not limited to, selectable elements (e.g., buttons, boxes, menus), navigational structures, organizational structure, or layout) of the native webpage associated with an entity (e.g., entity computing system 150). For example, the data protection interface 112 may receive code libraries (e.g., CSS (e.g., CSS, CSS2, CSS3, CSS4, and so on), HTML (e.g., HTML, HTML4, HTML5, HTML6, and so on), XML, style sheets, wrappers, textures, and so on) and frameworks (e.g., Django, Express Web, Node.js, JavaScript, Python) and store the code libraries and frameworks in the data protection database 120 for use at later point in time when a seller attempts to change or register payment preferences with the data protection system 110, in particular the data protection interface 112.

The data protection interface 112 can also be configured to generate and provide one or more graphical user interfaces (GUIs) to one or more computing devices (e.g., user devices 140, seller devices 170, and/or data protection system 110) for presentation. That is, the provided GUIs can execute and/or be displayed at the computing devices described herein. In some arrangements, the GUIs can be provided within a web browser or a mobile application. In some arrangements, the GUI can provide various sub GUIs. In various arrangements, data protection interface 112 interacts with a seller (e.g., via a secure connection) to receive sensitive data (or private data). For example, data protection interface 112 may receive payment preferences of third-parties (e.g., sellers) for processing transactions from users on the marketplace hosted by the entity computing systems 150.

The sensitive data may include payment information such as financial information and payment allocations (e.g., escrow, withholdings, and so on). The data protection system 110 may include instructions (e.g., scripts, executable code, etc.) that when interpreted by data protection interface 112 cause one or more computing devices described herein to display a graphical user interface such as an interactable web page and/or an interactive mobile application to a user (e.g., marketplace interface). In some arrangements, the graphical user interface may have the look and feel of the marketplace entity interface 152 based on the received code libraries and frameworks from the entity computing systems 150.

The processing system 114 is structured to process transactions based on received data from the marketplace computing system 150 and seller data (e.g., payment preferences) stored in the private seller dataset 122. For example, the received marketplace data can include routing numbers of the buyer and seller, account numbers of the buyer and seller, desired payment rails (e.g., wire, ACH, Zelle®, RTP, and so on), and any other information to effectuate a transfer from a buyer to a seller (e.g., cryptocurrency public key, cryptocurrency public and private key pair, credit card, debit card, card network, and so on). For example, the information may include a desired payment method by the buyer, which the processing circuit 114 uses to identify an issuer, contact the issuer, provide a destination routing and account number to the issuer, an amount for the transaction, a desired timing of the transaction (e.g., within one-day), etc. for the issuer to transfer the funds and any applicable fees. Accordingly, the received marketplace data can be utilized by the processing system 114 to process the transaction from the buyer to the seller.

In some arrangements, the data protection system 110 can be communicably coupled to a data protection database 120. The data protection database 120 is structured as a repository (e.g., database) to store various data (e.g., provider, entity, seller, user, and so on). In various arrangements, some of the data can be encrypted by an encryption operation utilizing a cryptographic function. For example, the cryptographic function could be a homomorphic encryption function. In other example, the cryptographic function could be any symmetric encryption function (e.g., Triple Data Encryption Standard (TDES), RC5, Advanced Encryption Standard (AES), Blowfish, CAST, and so on), and/or asymmetric encryption function (e.g. Rivest-Shamir-Adleman (RSA), Efficient and Compact Subgroup Trace Representation (ECSTR or XTR), Digital Secure, Escrowed Encryption Standard (EES), and so on).

As mentioned above, the data protection database 120 can be a database configured to store and/or maintain any of the information described herein. The data protection database 120 can maintain one or more data structures which can contain or index provider data, entity data, user data, seller data (e.g., stored as a private seller dataset 122), data protection data, transaction data, application code, encryption code, decryption code, and/or database keys. In one example, the production database 116 may store one or more sensitive data records (e.g., in private seller dataset 122). The data protection database 120 can be accessed using one or more memory addresses or index values. The data protection database 120 can be accessed by the components of the one or more processing circuits described herein (e.g., data protection system 110, or any other system and/or devices described herein via the data acquisition engine 180) via the network 130. That is, the data protection database 120 may be in communication with one or more processing circuits of the data protection system 110 and/or seller devices 170 via a private communication (sometimes referred to herein as a "secure connection"), in that one or more datasets (e.g., private seller dataset 122) stored in the data protection database 120 that is inaccessible (e.g., isolated from) from the entity computing system 150.

In some arrangements, the data protection database 120 can exist external to the data protection system 110 and may be accessed via a communication network (e.g., network 130). The data protection database 120 can be distributed across many different computer systems or storage elements and may be accessed via the communication network or a suitable computer bus interface. The one or more processing circuits of the data protection system 110 can store, in the data protection database 120, the results of any or all computations, determinations, encryptions, decryptions, selections, identifications, generations, constructions, or calculations in one or more data structures indexed with appropriate values, each of which may be accessed by the one or more processing circuits of the data protection system 110 to perform any of the functionalities or functions described herein.

In various arrangements, the data protection database 120 includes various transitory and/or non-transitory storage mediums. The storage mediums may include but are not limited to magnetic storage, optical storage, flash storage, RAM, and so on. The one or more processing circuits can use various APIs to perform database functions (e.g., managing data stored in the data protection database 120). The APIs can be but are not limited to SQL, NoSQL, NewSQL, ODBC, JDBC, and so on.

The private seller dataset 122 can include personal information (e.g., names, addresses, phone numbers, and so on), authentication information (e.g., username/password combinations, device authentication tokens, security question answers, unique client identifiers, biometric data, geographic data, social media data, and so on), financial information (e.g., token information, account numbers, account balances, available credit, credit history, exchange histories, and so on), and payment preferences (e.g., preferred payment method, auto-payment, auto-escrow, 401k contributions, bank account number, routing number, payment card industry (PCI) data, banking data, or personal identifiable information (PII), and so on) relating to each seller. As shown, in contrast to the public seller dataset 156 of entity database 154, the private seller dataset 122 can include financial information and payment preferences of the seller (e.g., or sensitive data of the seller). In some arrangements, when a seller device (e.g., 170) requests to register and/or change one or more payment preferences (e.g., bank account number), via an application interface that can be a component import of a native webpage hosted by the entity computing system 150, the data protection system 110 can establish a secure connection such that the marketplace computing system 150 (of which hosts the marketplace) is masked (or cannot access) from any changes to the payment preferences. In one example, John Doe (e.g., seller) may sell clocks on marketplace W but recently switched banks. Thus, John may navigate to the payment preferences on the marketplace's native webpage to modify John's bank account number and routing number. In this example, John's seller device (e.g., mobile phone) may establish a secure connection (e.g., knowingly, or unknowingly) with the data protection system 110 to modify payment preferences in real-time such that whenever John sells the next clock on marketplace W, John will receive payment at his new bank account. Accordingly, the data protection architectures described herein enables entities to host marketplaces for goods and services without potentially exposing and processing transactions utilizing sensitive data, thereby improving data protection architectures. Therefore, aspects of the present disclosure address problems in data protection by maintaining the privacy of sensitive data utilized to perform transactions between a customer and seller on an online marketplace.

In some arrangements, the payment preferences can include thresholds for routing payments to a particular account of a seller. For example, if a payment amount is below $100 the payment should be routed to seller account A, otherwise it is routed to seller account B. In various arrangements, the payment preferences can include routing preferences based on payment type. For example, if the payment type is credit card, the payment should be routed to seller account A, if the payment type is wire, the payment should be routed to seller account B, and if the payment type is cryptocurrency, the payment should be routed to seller account C. Thus, the payment preferences may define what seller account receives the funds of a sale based on the characteristics of the sale (e.g., amount, payment type, etc.). Thus, the payment preferences may define recipient accounts for transactions based on at least one of a transaction amount, a marketplace identity (e.g., for Marketplace A, the account is Account A while for Marketplace B, the account is Account B; this may be desirable for tracking purposes), a selected rail for the transaction (e.g., wire versus credit card, etc.), and so on.

Figure 2:
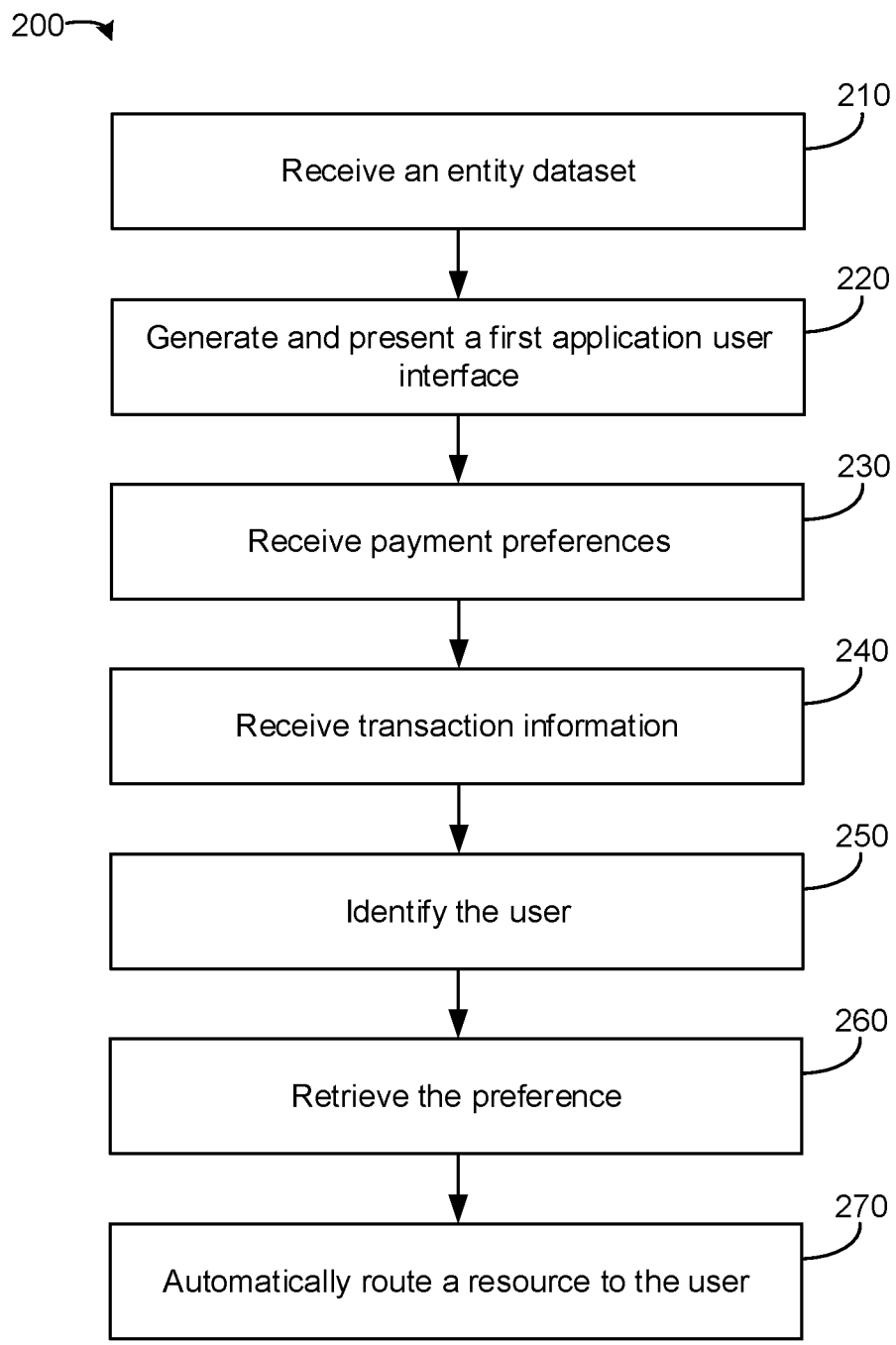
FIG. 2 is a flowchart for a method of protecting data that may be implemented or performed by one or more components/systems of FIG. 1, according to some arrangements.

Referring now to FIG. 2, a flowchart for a method 200 of protecting data in a computer network environment is shown, according to some arrangements. Data protection system 110 can be configured to perform method 200. In an overview of method 200, at block 210, the data protection system 110 receives an entity dataset. At block 220, the data protection system 110 generates and presents a first application user interface (e.g., 308). At block 230, the data protection system 110 receives a preference. At block 240, the data protection system 110 receives transaction information. At block 250, the data protection system 110 identifies the user. At block 260, the data protection system 110 retrieves the preference. At block 270, the data protection system 110 automatically routes a resource to the user. Additional, fewer, or different operations may be performed depending on the particular arrangement. In various arrangements, each operation may be re-ordered, added, removed, or repeated.

Method 200 describes a process for protecting payment information of a seller from other entities (e.g., digital marketplace) such that a sale occurring on a digital marketplace can occur without the marketplace collecting, storing, or generating payment information. Accordingly, the described method 200 and systems herein provide an improved data protection architecture for processing payments for a digital marketplace utilizing payment information that is inaccessible to the marketplace. In particular, the data protection architecture described herein enables sellers to sell products on one or more marketplaces while having their data protected (e.g., from collection and storing) by the marketplace. As described herein, the data protection system 110 provides a comport import and/or sandbox interface (e.g., security mechanism for isolating the data protection system 110 (e.g., code and data) from the marketplace entity computing system 150 (e.g., code and data)) for configuring payment preferences of the seller for the marketplace while concealing such preferences from the marketplace. As described in method 200, the comport import and/or sandbox interface (e.g., first application user interface) can be generated and presented as a component import (or an imported sandbox, HTML import, etc.) of a native webpage hosted by the marketplace.

Referring to method 200 in more detail, at block 210, the data protection system 110 receives an entity dataset comprising marketplace design preferences that define styling and designs of an online marketplace provided by a marketplace entity computing system (or marketplace computing system). In some arrangements, the marketplace design preferences include styling information such as, but not limited to, one or more libraries or one or more frameworks for styling the plurality of interactive elements. In this way, the marketplace design preferences enable the user (e.g., seller) to customize the look and feel of the online marketplace such that when users interface with the online marketplace they receive a customized experience based on the seller defining marketplace design preferences.

At block 220, the data protection system 110 generates and presents, on a user device 140 (or seller device 170), a first application user interface based on the marketplace design preferences. The first application user interface may include a plurality of interactive elements associated with payment information of a user (or seller). The first application user interface can include a plurality of interactive elements associated with payment information of a seller. In some arrangements, the presented first application user interface can be generated and configured by the data protection interface 112 based on the one or more libraries or one or more frameworks (e.g., look and feel). As described with reference to FIG. 1, the seller device 170 and the data protection system 110 can establish a secure connection. In other embodiments, the seller device 170 may host a client application that generates and provides the first application user interface.

In various arrangements, the first application user interface (e.g., data protection interface 112) can be hosted by the data protection system 110 such that the first application user interface is a component import of a native webpage hosted by the marketplace entity computing system 150. In some arrangements, a second application interface (e.g., entity interface 152) can be hosted by the marketplace entity computing system 150 that can be configured to present the marketplace and allow users and/or third-parties to interact with the marketplace including modifying one or more preferences of a seller.

Additionally, the data protection system 110 can determine a response (e.g., number of conversions, number of transactions, number of sales, number of account registrations, and so on) indicating particular amounts which may via different currencies (e.g., fiat currency, cryptocurrencies) associated with the transaction. In particular, in view of the determined response, the data protection system 110 can determine a lending rate for an amount of funds based on the response. In some arrangements, the data protection system 110 can receive historical data and other response data from the entity computing system 150 and in particular, entity dataset 158. Accordingly, the data protection system 110 can determine a loan amount and a lending rate based on various factors such as, but not limited to, credit score (e.g., stored in private seller dataset 122), debt-to-income ratio (e.g., based on accounts and debt in private seller dataset 122), credit history, financial profile, income compared to other third-parties, product/service that is being sold (e.g., demand, is it protected by a patent), if an emergency occurred (e.g., pandemic, epidemic, natural disaster, and so on), federal/state programs, and so on. For example, if a response indicates a steady income (e.g., average $1,000 weekly from sales of products) for Jane Doe (e.g., seller), and Jane's credit score is above (or below) a predetermine threshold (e.g., 600, 700, 740), a predefined loan amount (e.g., $500,000) with a predefined interest rate (e.g., 2.125%) may be presented (or updated) on the first application user interface. The presented offer can be an interactive element selectable by the seller to see terms and conditions and/or accept the offer (e.g., FIG. 3D).

In some arrangements, the seller can establish an activation condition (e.g., gesture, input, pattern, combination thereof, etc.) with the marketplace client application 172 such that when the activation condition occurs the first application user interface can be presented. For example, upon a shake of the phone, the first application user interface can establish a secure connection with the seller to, for example, receive payment preferences (or other sensitive data). In another example, upon a seller providing a finger pattern on the display on the seller device 170, the first application user interface can establish a secure connection with the seller to receive payment preferences (or other sensitive data). In various arrangements, the seller can establish a plurality of activation conditions with the marketplace client application 172 such that whenever one of the activation conditions occurs an interface is presented.

At block 230, the data protection system 110 can receive a preference (e.g., payment preference) in response to a selection of a first interactive element of the plurality of interactive elements provided via the first application user interface. In some arrangements, the first interactive element (e.g., described in detail with reference to FIGS. 3-4) can be an element presented on the first application user interface that the seller interacts with to perform a particular function or action. Furthermore, payment preferences can be modified in real-time when the user navigates to the payment preferences section of the first application graphical user interface. In various arrangements, the payment preferences can be received over the established secure connection in block 220. In some arrangements, until the seller exits (e.g., closes, returns) the first application user interface, the seller device 170 and data protection system 110 can continue to maintain a secure connection. In particular, while the secure connection is maintained, the marketplace entity computing system 150 may be unable to access the seller device.

In various arrangements, the seller device 170 can register an account (sometimes referred to herein as a "profile") with the marketplace computing system 150 and/or the data protection system 110. During registration, the seller may input various preferences and account information and upon completion the marketplace computing system 150, in particular marketplace entity interface 152, can store public seller data in the public seller dataset 156 and the data protection system 110, in particular data protection interface 112, can store private seller data in the private seller dataset 122.

At block 240, the data protection system 110 receives, from the marketplace entity computing system 150, transaction information regarding a transaction. In some arrangements, the transaction information can be an indication of a transaction and can be received in response to a customer performing a transaction for one or more goods or services in the online marketplace. For example, the customer may add various goods or services to a cart in the online marketplace and checkout with those items. During the checkout, the user may provide payment information for routing purposes such that the seller can be paid. In various arrangements, the user may purchase a plurality of goods or services from a plurality of sellers in one transaction. In the following arrangement, the data protection system 110 can determine each seller associated with the purchased goods or services and route payment to each seller as described with reference to block 250. In particular, the transaction information may include information regarding the purchased product(s) and/or service(s) (e.g., serial number, identifier, etc.). In one embodiment, the marketplace computing system 150 stores the product and/or service serial number alongside a seller identifier (e.g., a number, alpha, alphanumeric, and/or other identifier regarding the seller). Thus, the marketplace computing system 150 may readily identify the seller based on correlating the product and/or service identifier to a seller identifier. Accordingly, the data protection system 110 may then receive the identification of the seller along with other pertinent transaction information. The data protection system 110 may then retrieve the preferences of the seller (process 260 described below). In another example, the data protection system 110 may receive the transaction information, which may include similar information described above. In response, the data protection system 110 may correlate the seller information to information stored in a seller database to identify the identity of the seller, and subsequently retrieve a preference of the seller (process 260 described below).

As an example, a customer of a marketplace may select a hat to buy from Hat Company ABC on a digital marketplace. To complete the purchase, the customer provides their credit card information. The data protection system 110 can receive from the marketplace computing system 150, the credit card information and additional transaction information such as the price of the good, type of good, any coupons used, shipping information, Hat Company ABC information, a current time, data stored in the public seller dataset 156, data stored in the entity dataset 158, and so on. Accordingly, based on the following example and as described herein, the data protection system 110 can determine the seller (e.g., based on the received transaction information) and provide a payment (e.g., utilizing the credit card information) to the seller based on the payment preferences stored in the private seller dataset 122 by the data protection system 110.

Furthermore, the data protection system 110 can determine taxes (or other fees, such as marketplace exchange service fees, per transaction fee, etc.) associated with the transaction. In some arrangements, the data protection system 110 can collect, query, request, and receive tax/fee data from one or more systems and/or devices described herein (e.g., 140, 150, 160, 170). In particular, the tax/fee data may be based on state (or country) and can include various federal and state rules (e.g., laws) indicating the percentages and amounts that may be required to be taxed and the appropriate taxing authority to pay such taxes too (e.g., federal government, state government, local government, country). In some arrangements, a geolocation (e.g., latitude and longitude) of the seller device 170, user devices 140, and/or marketplace computing systems 150 may be collected or received such that the appropriate taxing authority can be determined. For example, if a user device 140 attempts to make a purchase for a good from Texas but the seller devices 170 ship the goods California, the data protection system 110 may determine, based on the tax data and geolocation data, what the proper allocation of taxes should be. Accordingly, upon receival of an indication of a transaction, the data protection system 110 can determine taxes and/or fees for the transaction and deduct the determined taxes and/or fees from the amount associated with the transaction (e.g., 5.5% for state government, 1% for federal government, 1% for local government, a 1% tariff, a per transaction fee, a percentage fee collected by the data protection system 110). In various arrangements, the deducted taxes can be stored in an escrow account of the seller, such as in data protection database 120. Sometimes, a seller may not have an escrow account (e.g., first sale), and if that occurs, the data protection system 110 may create an escrow account with an account number and routing number for future escrow payments to be allocated to.

At block 250, the data protection system 110 can identify the user (e.g., seller) based on correlating the transaction information to the user. Identifying can include querying the stored private seller dataset 122. For example, the data protection system 110 can determine the account number and routing number of the seller and process the payment from a user (e.g., customer) to the seller's account. In some arrangements, the payment from the user device can include an account number, routing number, and other payment information for routing the payment to an account of the seller. In various arrangements, the transaction information can include identifying information (e.g., value, product, seller) that can used by the data protection system 110 to identify the seller. For example, the private seller dataset 122 may include a list of products and/or services each seller of a plurality of sellers sells on each marketplace. In the following example, the list can be cross-referenced and/or correlated with the received transaction information to identify the seller.

At block 260, the data protection system 110 can retrieve the preference based on identifying the user. In some arrangements, the identified user (e.g., seller) can include preferences stored in the private seller dataset 122. The data protection system 110 can query the private seller dataset 122 for the preferences.

At block 270, the data protection system 110 can automatically route a resource (e.g., funds) to the user based on the retrieved preference. In various arrangements, the routing can occur in response to receiving a payment from a user device for the good or service. In some arrangements, the indication of the payment can be routed (e.g., by the processing system 114) based on the stored private seller dataset 122. For example, the data protection system 110 can determine the account number and routing number of the seller and process the payment from a user to the seller's account. In some arrangements, the payment from the user device can include an account number, routing number, and other payment information for routing the payment to an account of the seller.

In some arrangements, the at least one processing circuit and the user device exchange information utilizing a first application programming interface (API), wherein the at least one processing circuit and the marketplace computing system exchange information utilizing a second application programming interface (API). In particular, utilizing a first API can include executing unique API calls associated with the first API. For example, the at least one processing circuit can execute API calls that update a preference and that returns a successful or unsuccessful response from the user device (e.g., 170). Furthermore, utilizing a second API can include executing unique API calls associated with the second API. For example, the at least one processing circuit can execute API calls that update a first application user interface and that returns a successful or unsuccessful response from the marketplace entity computing system (e.g., 150). In one embodiment, the first and second APIs are the same. In another embodiment, the first and second APIs are different.

In various arrangements, the API calls can include various querying, updating, storing calls that can return various data. With reference the first API and second API, it should be understood that each device and/or system described herein can have a unique API with specific API calls and API returns. For example, the user device (e.g., seller device 170) may implement an API and broadcast or provide seller API calls for interacting with the user device using seller API calls. In another example, the marketplace entity computing system (e.g., 150) may implement an API and broadcast or provide marketplace API calls for interacting with the marketplace entity computing system using marketplace API calls.

Referring now to FIGS. 3A-4E, example illustrations of a first application graphical user interface 308 and a marketplace graphical user interface 300, according to some arrangements. The first application user interface enables a seller (also referred to herein as a "user") to modify payment preferences of the user for payments received via the online/digital marketplace in real-time. In various arrangements, the seller may have a user account with login credentials associated therewith for the online marketplace and seller data stored in a database (e.g., public seller dataset 156 and/or private seller dataset 122). In particular, the seller data can include a private subset (or sensitive) and public subset (or non-sensitive). In some arrangements, the private subset can be stored in the data protection database 120, and in particular the private seller dataset 122, and the public subset can be stored in the entity database 154, and in particular the public seller dataset 156. In some arrangements, the public seller dataset 122 can include information regarding products or services of the seller to be provided and offered on the marketplace, some personal identifying information, account security questions, account credentials, emergency contact information, biometric information, geo-location data indicating one or more locations of a person and/or device, photographs, videos, other content, criminal records, and so on. In various arrangements, private (or sensitive) seller data can include, but is not limited to, social security numbers, passport number, payment preferences, financial information, and so on. Accordingly, the data protection architecture utilization of secure connections between the first application graphical user interface 172 and data protection interface 112 minimizes cyber security vulnerabilities of entities, reduces storage requirements, and cybersecurity monitoring (e.g., processing load) of marketplace computing systems 150 such that the overall design of the data protection architecture is improved. In some arrangements, the seller can provide payment preferences for every marketplace they sell goods or services. In the following arrangement, the data protection system 110 can determine the marketplaces and establish a connection with the online marketplace, as described in detail with reference to the first application user interface 172 in FIG. 1.

Figure 3A:
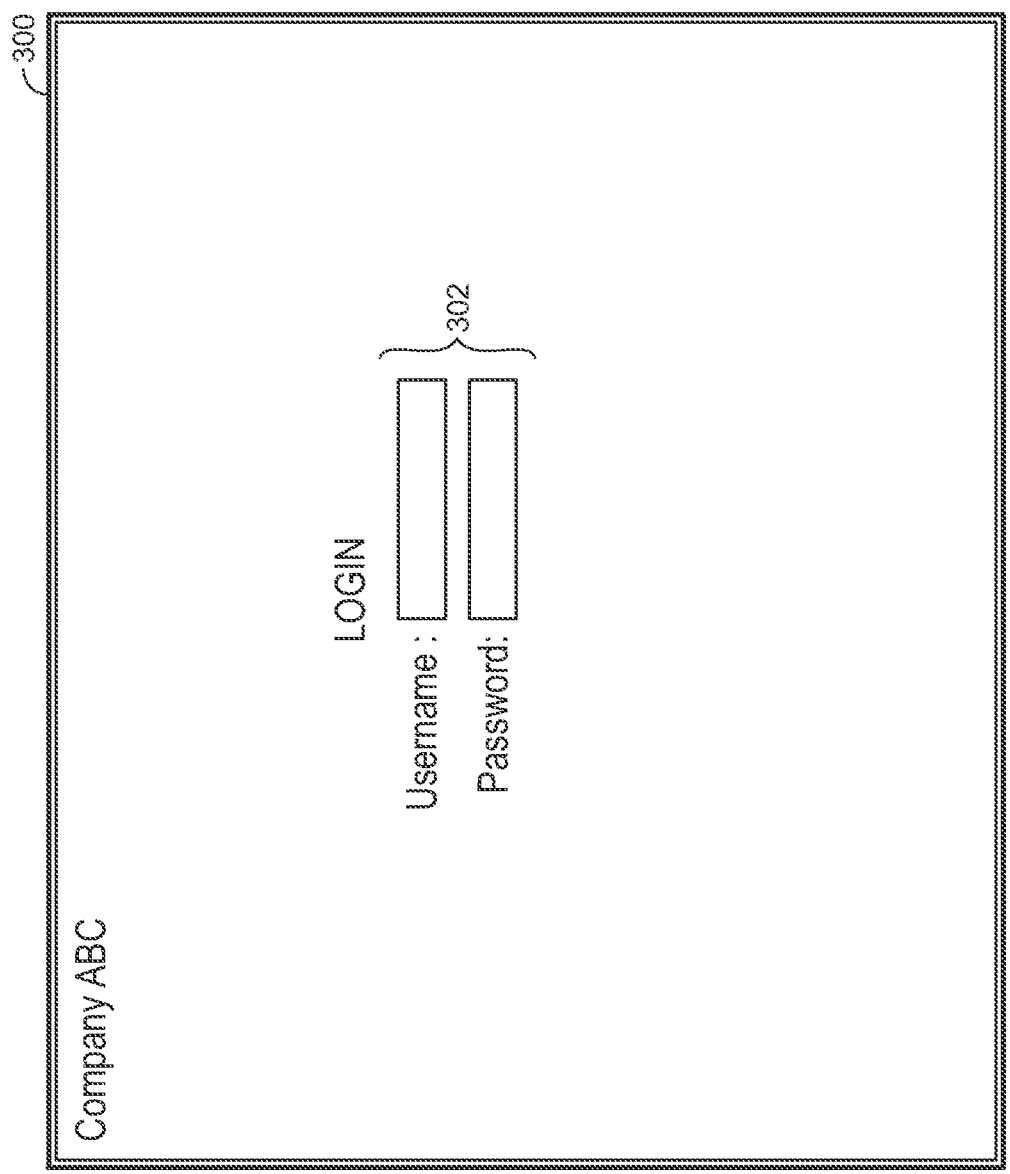
FIGS. 3A-3E are example graphical user interfaces depicting a first application user interface and a marketplace interface, according to some arrangements.

Referring to FIGS. 3A-3D in more detail, FIG. 3A illustrates a seller device that has navigated to an online marketplace webpage (e.g., via a URL) or marketplace client application (e.g., mobile application) that presents a marketplace interface 300. As shown, the marketplace interface 300 can include a plurality of interactive elements including login interactive elements 302. Interactive elements (e.g., input fields, scroll elements, selectable icons, etc.) can include, but are not limited to, text input, buttons, drop-downs, speech-to-text, and so on. Furthermore, various interactive elements are contemplated in this disclosure. For example, a user may input (e.g., via a touchscreen keyboard) login credentials to login interactive element 302.

Figure 3B:
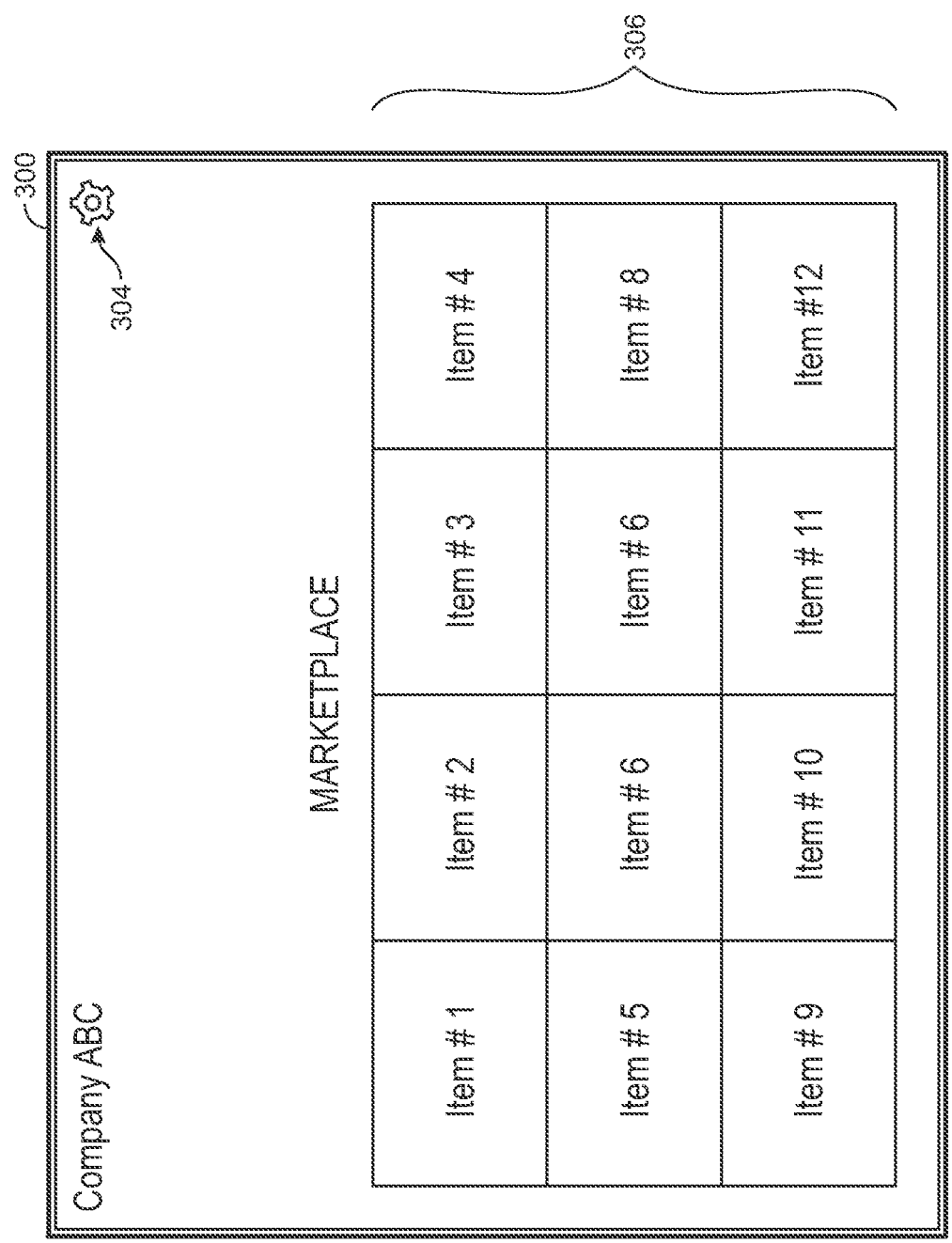

In example illustration FIG. 3B, once the seller provides input to various interactive elements in marketplace interface 300, the seller device 170 may be presented with an updated marketplace interface 300 which can include a plurality of interactive elements including marketplace interactive elements 306 (e.g., Item #1, Item #2, Item #3, and so on) and a preference interactive element 304. For example, a seller may select (e.g., via a touchscreen) the preference interactive element 304.

Figure 3C:
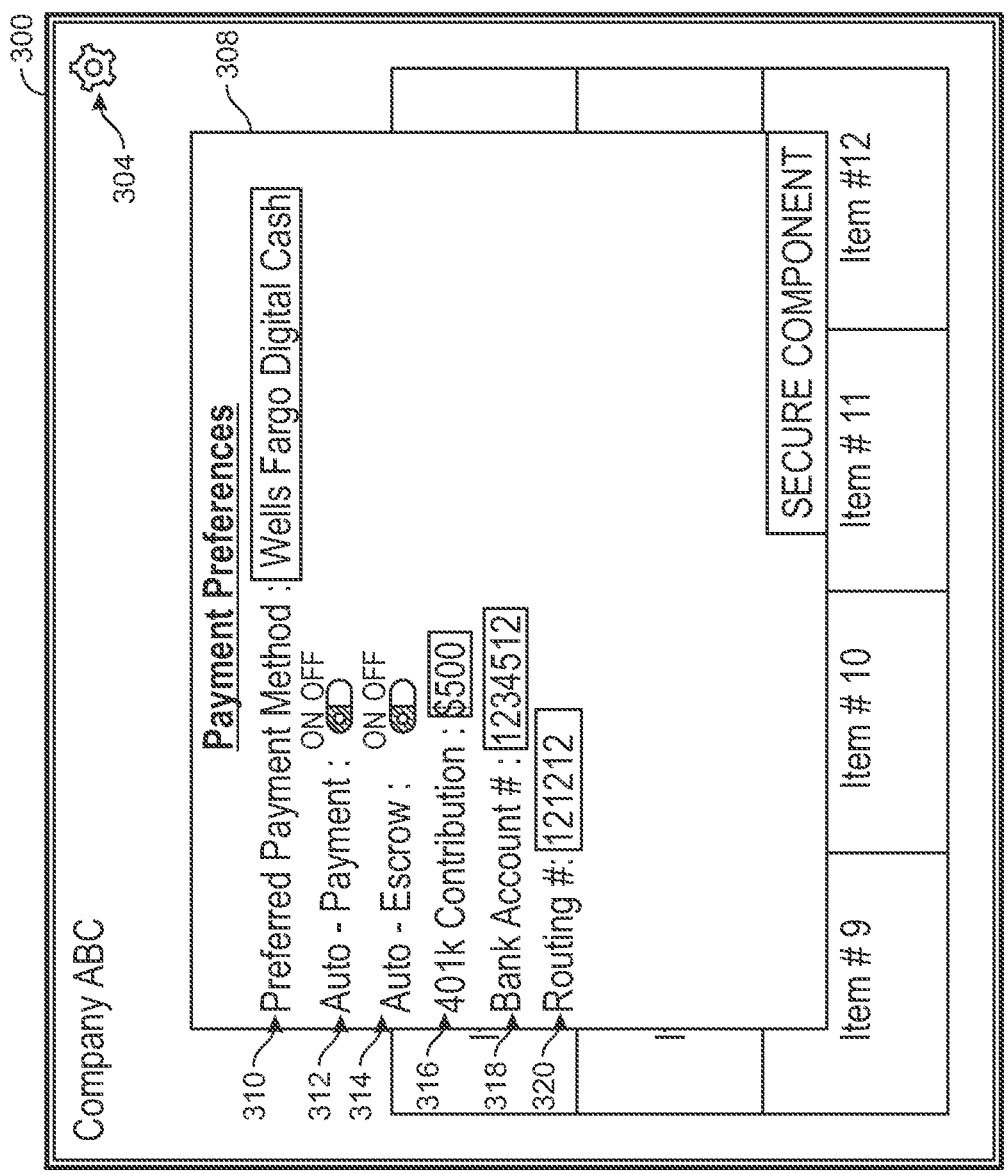

In example illustration FIG. 3C, upon selection of preference interactive element 304 of FIG. 3B, the marketplace client application 172, communicating with data protection interface 112 over network 130 and via data acquisition engine 180, can present the first application user interface 308 including the payment preferences. The first application graphical user interface can provide a payment preferences page and include certain sensitive data (or private data) within one or more interactive elements, such as, but not limited to, preferred payment method interactive element 310 (e.g., drop-down menu), auto-payment interactive element 312, auto-escrow interactive element 314, retirement interactive element 316, bank account interactive element 318, and routing interactive element 320. In some arrangements, the communication between the data protection interface 112 and the marketplace client application 172 may be over a secure connection.

Figure 3D:
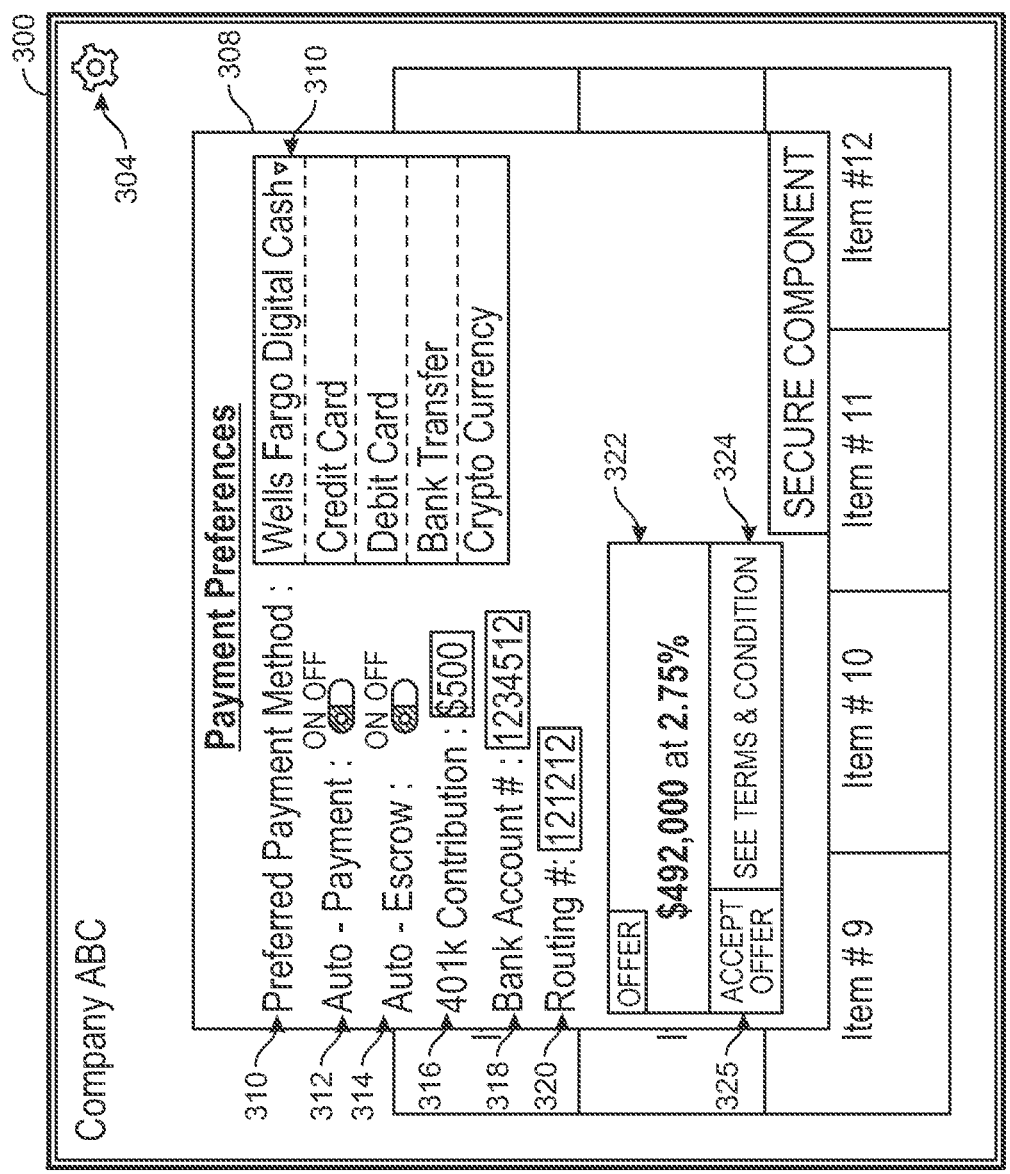

In example illustration FIG. 3D, the data protection interface 112 may analyze various public (e.g., 156) and private data (e.g., 122) of the seller to determine an offer (or loan). As shown, the offer interactive element 322 can include various data associated with a loan (e.g., interest rate, loan amount), and within the offer interactive element 322 it can include, but is not limited to, the accept offer interactive element 325 and a terms and conditions (T&C) interactive element 324. Accordingly, the seller could accept the offer by selecting accept offer interactive element 325 and/or review the terms and conditions by selecting T&C interactive element 324.

Figure 3E:
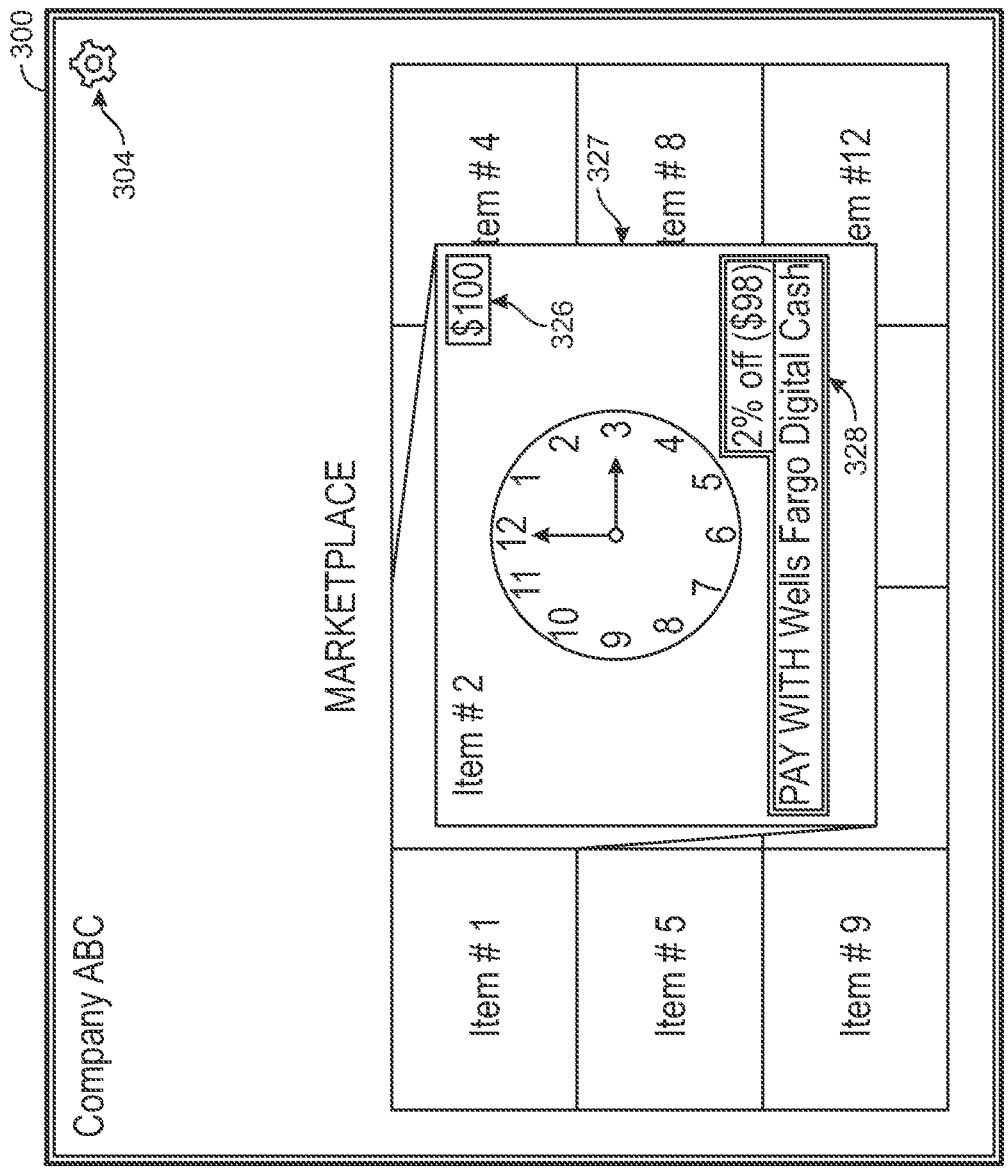

In example illustration FIG. 3E, upon selection of one or the marketplace interactive elements 306 (e.g., Item #2) by a user (e.g., buyer on a user device), the item interactive element 327 can be expanded (e.g., overlayed over marketplace interface 300). Expanding can include scaling and/or overlaying the item interactive element 327 that can include additional information regarding the item (e.g., Item #2). As shown, the item interactive element 327 can include a purchase interactive element 328 and a price interactive element 326. In some arrangements, the data protection interface 112 will offer a discount if the user uses the preferred payment methods set by the user on the first application user interface 308. In some arrangements, upon selection of purchase interactive element 328, the entity computing system 150 can send an indication to the data protection system (e.g., processing system 114) to process a transaction for the selected item at the designated price.

Referring now to FIGS. 4A-4D, example illustrations of a registration interface 400, according to some arrangements. In general, the registration graphical user interface 400 enables a seller to register an account (or profile) of the seller with the marketplace (e.g., entity computing system 150, via an entity interface 152). In one embodiment, the graphical user interface 400 is provided by the seller device, via a client application provided and supported by the marketplace computing system (i.e., as a downloaded application configured to execute or run on the seller device 170). In another embodiment, the graphical user interface 400 is provided by the marketplace computing system 150 as a hosted website and is accessible by the seller device via the network. In various arrangements, the seller may have a user account with login credentials and seller data stored in a database (e.g., public seller dataset 156 and/or private seller dataset 122). In particular, the seller data can include a private subset (or sensitive) and public subset. In some arrangements, the private subset can be stored in the data protection database 120, and in particular the private seller dataset 122, and the public subset can be stored in the entity database 154, and in particular the public seller dataset 156. In some arrangements, the public seller data can include information regarding products or services of the seller to be provided and offered on the marketplace, some personal identifying information, account security questions, account credentials, emergency contact information, biometric information, geolocation data indicating one or more locations of a person, photographs, videos, other content, criminal records, and so on. In various arrangements, private (or sensitive) seller data can include, but is not limited to, social security numbers, passport number, payment preferences, financial information, and so on. Accordingly, the data protection architecture including maintaining the privacy of portions of the seller data (e.g., private seller dataset 122) specific to a seller while providing entities with transaction processing, minimizes cyber security vulnerabilities such that the overall design of the data protection architecture is improved.

In some arrangements, once the seller provides an input to various interactive elements in registration graphical user interface 400, the seller device 170 may send, provide, or otherwise (e.g., over network 130) the input to the marketplace computing system 150 and/or the data protection system 110 for storage and/or analysis. In various arrangements, the seller associated with an account may be able to manage the various preferences with the marketplace client application 172 in real-time. For example, a product/service can be added, and preferences associated with the product/service can be changed and/or modified in real-time. Management can include, but not limited to, adding new products/services, removing products/services, changing preferences (e.g., general, payment), and so on.

Figure 4A:
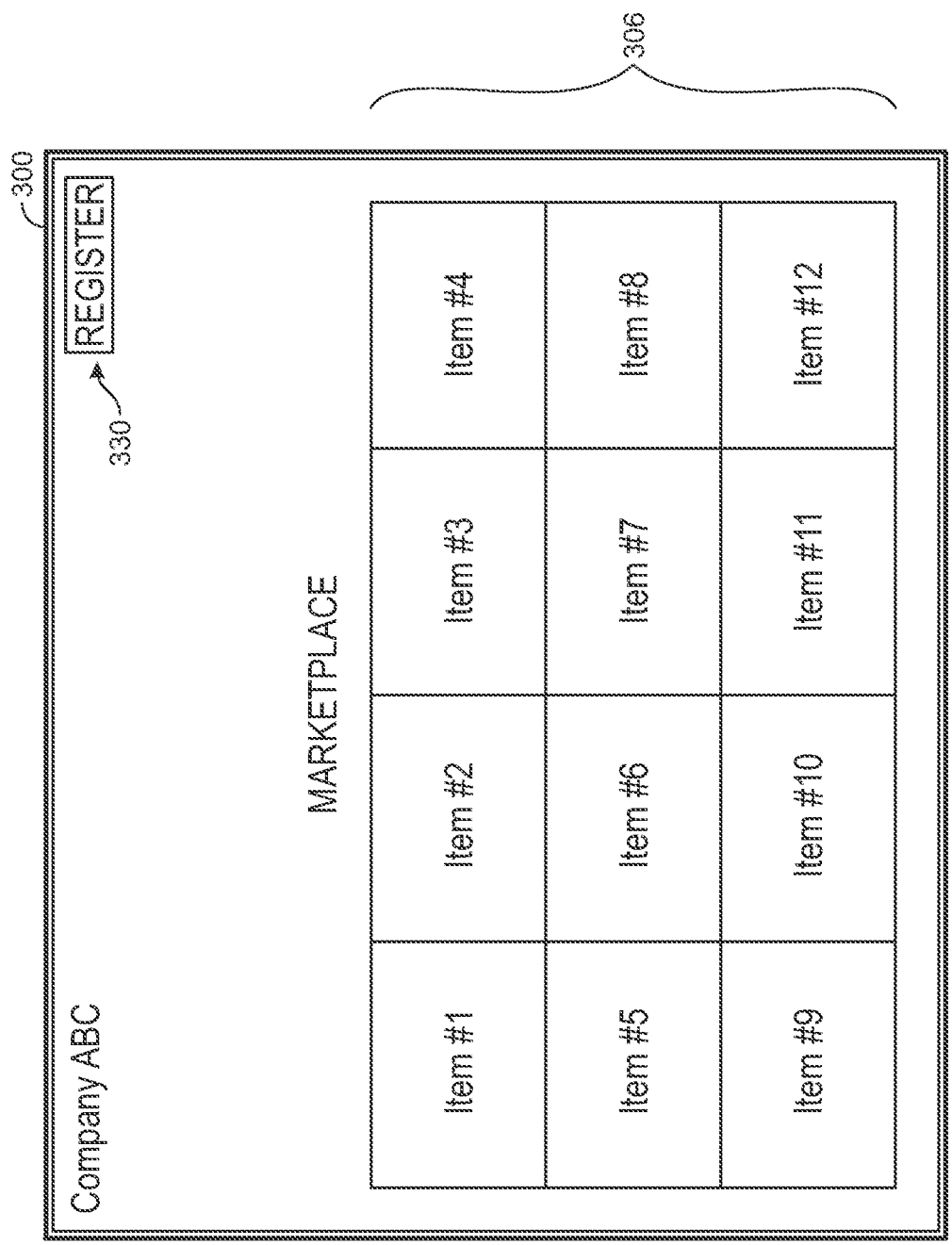

Referring to FIGS. 4A-4D in more detail, FIG. 4A illustrates a seller device that has either navigated to a marketplace webpage or accessed a marketplace client application that provides, displays, or presents a marketplace interface 300. As shown, the marketplace user interface 300 can include a plurality of interactive elements including marketplace interactive elements 306 (e.g., Item #1, Item #2, Item #3, and so on) and a registration interactive element 330. Interactive elements (sometimes referred to herein as "input fields") can include, but are not limited to, text input, buttons, drop-downs, links, speech-to-text, and so on. Furthermore, various interactive elements are contemplated in this disclosure. For example, a user may select (e.g., via a touchscreen) the registration interactive element 330.

Figure 4B:
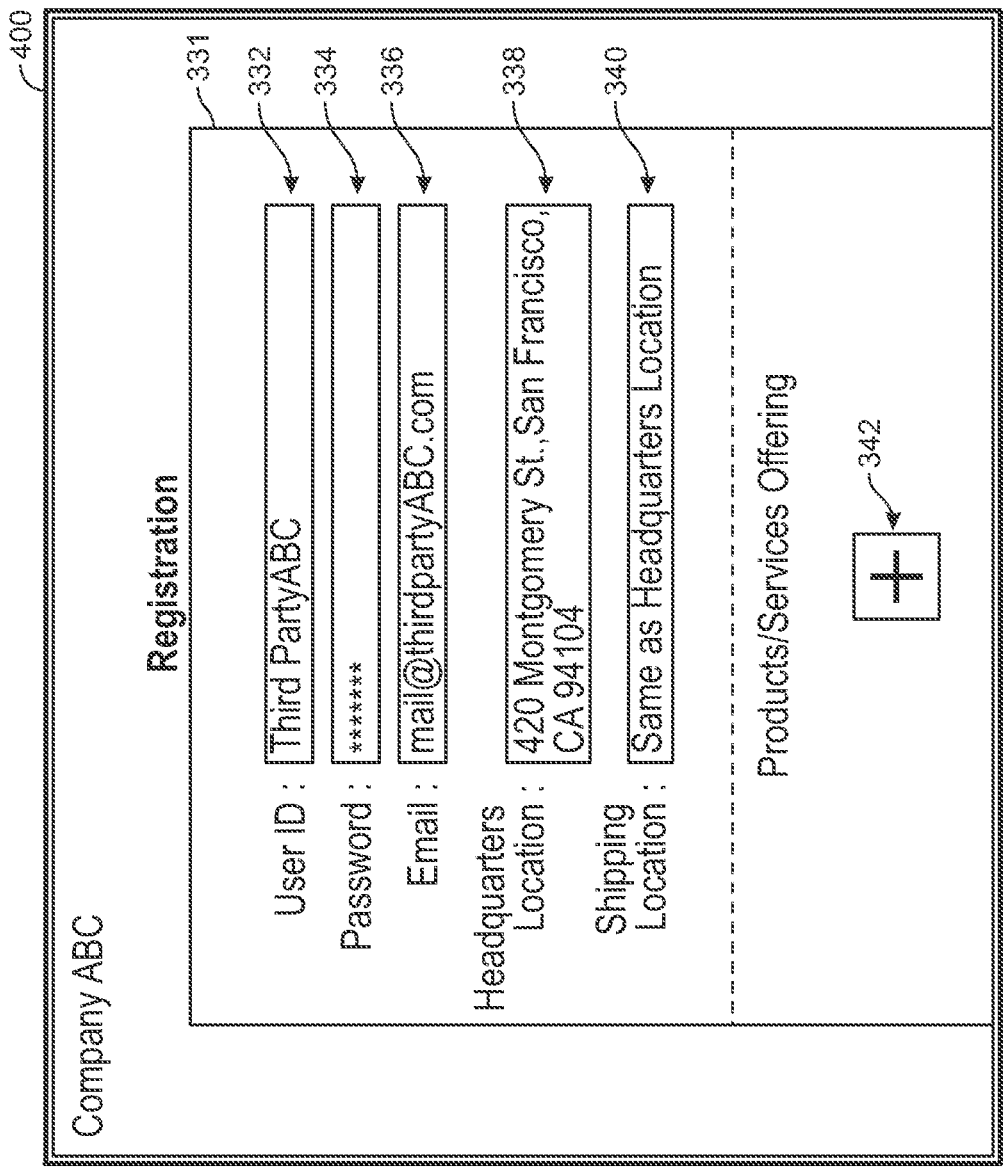

In example illustration FIG. 4B, a registration page 331 of the registration user interface 400 can include various registration interactive elements that may be presented, such as, but not limited to, a user ID interactive element 332 (e.g., text field), a password interactive element 334 (e.g., password text field), an email interactive element 336, a headquarter location interactive element 338 (e.g., geolocation field), a shipping location interactive element 340, and a product/service interactive field 342. In some arrangements, each interactive element can receive an input, via a seller device 170, and be updated as the user inputs (or interacts) with the interactive element. In various arrangements, each page (e.g., 331, 341, 358) can be an individual interface such as, a first application user interface, a second application interface, a third application interface, and so on.

Figure 4C:
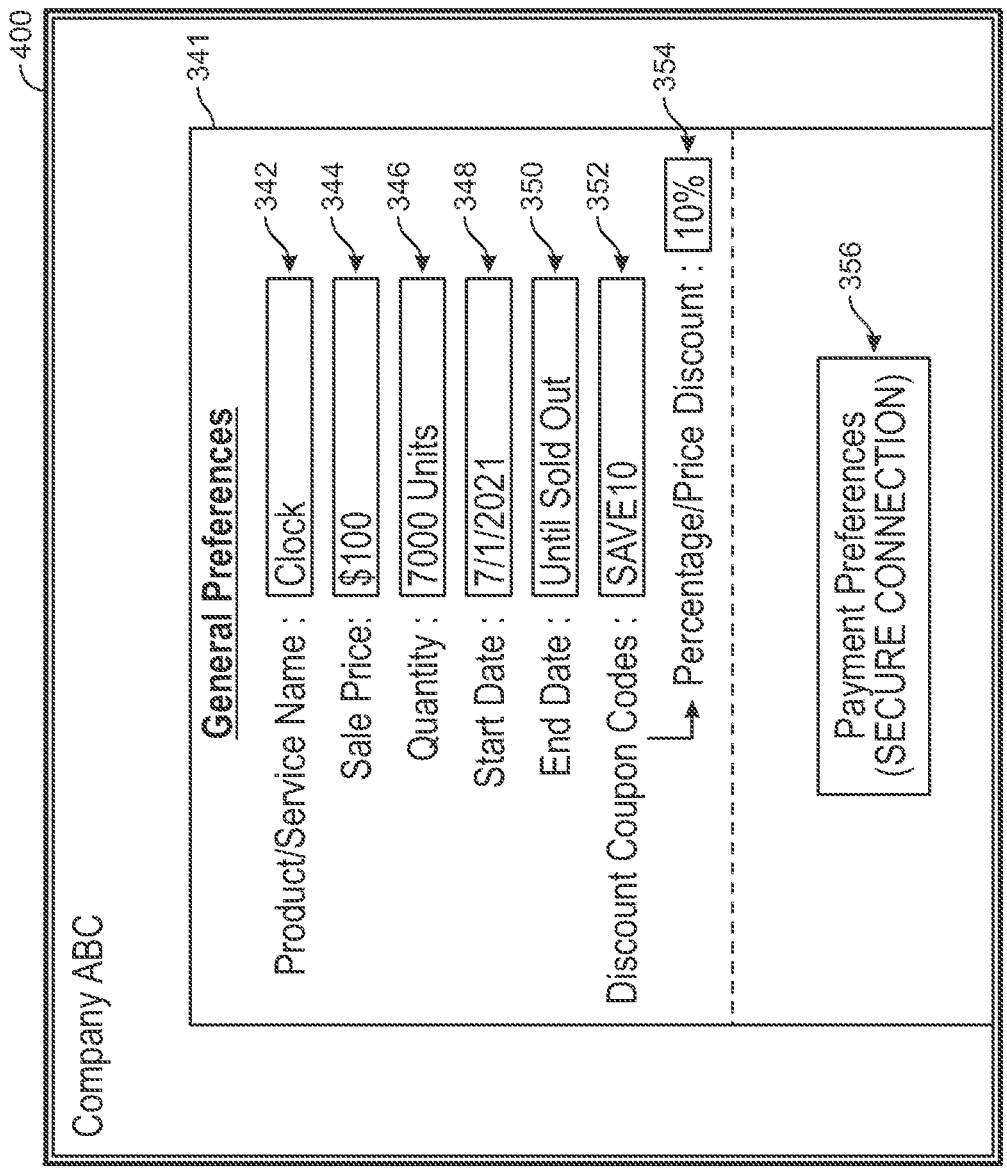

In example illustration FIG. 4C, upon selection of interactive element 342 of FIG. 4B, the marketplace client application 172 may itself generate or may communicate with the marketplace interface 152 that generates and provides over network 130 a general preferences page 341 of the registration user interface 400. The general preferences page can include various registration interactive elements, such as, but not limited to, product/service interactive element 342, a sale price interactive element 344, a quantity interactive element 346, a start date interactive element 348 (e.g., date field), an end date interactive element 350, a discount interactive element 352, a percentage/price discount interactive element 354. As also shown, the registration interface 400 can include a payment preferences interactive element 356.

In example illustration FIG. 4D, upon selection of payment preferences interactive element 356 of FIG. 4C, the marketplace client application 172 may itself generate or may communicate with the data protection interface 112 of the data protection system 110 that generates and provides over network 130, a payment preferences page 358 (e.g., first application user interface 302 of FIG. 3) of the registration interface 400. The payment preferences page can include various sensitive data (or private data) interactive elements, such as, but not limited to, preferred payment method interactive element 360, auto-payment interactive element 362, auto-escrow interactive element 364, retirement interactive element 366, bank account interactive element 368, routing interactive element 370, and SSN interactive element 372. In some arrangements, the communication between the data protection interface 112 and the marketplace client application 172 may be over a secure connection.

Figure 5:
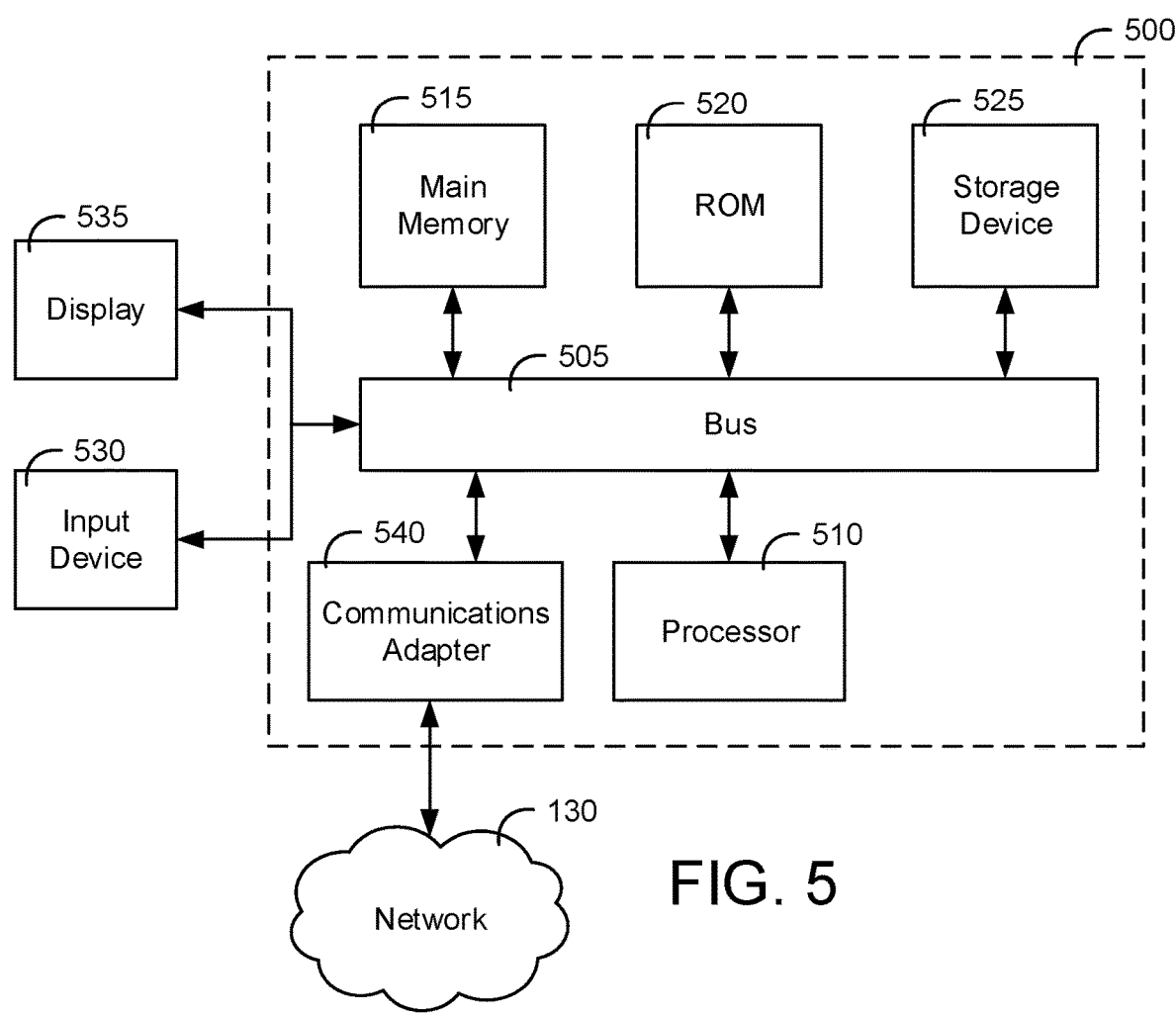
FIG. 5 is a block diagram illustrating an example computing system suitable for use in the various arrangements described herein.

Referring now to FIG. 5, a depiction of a computer system 500 is shown. The computer system 500 may represent data protection system 110, user devices 140, marketplace computing systems 150, data sources 160, seller devices 170, and/or various other example computing systems described herein. The computing system 500 includes a bus 505 or other communication component for communicating information and a processor 510 coupled to the bus 505 for processing information. The computing system 500 also includes main memory 515, such as a random-access memory (RAM) or other dynamic storage device, coupled to the bus 505 for storing information, and instructions to be executed by the processor 510. Main memory 515 can also be used for storing position information, temporary variables, or other intermediate information during execution of instructions by the processor 510. The computing system

500 may further include a read only memory (ROM) 520 or other static storage device coupled to the bus 505 for storing static information and instructions for the processor 510. A storage device 525, such as a solid-state device, magnetic disk, or optical disk, is coupled to the bus 505 for persistently storing information and instructions.

The computing system 500 may be coupled via the bus 505 to a display 535, such as a liquid crystal display, or active-matrix display, for displaying information to a user. An input device 530, such as a keyboard including alpha-numeric and other keys, may be coupled to the bus 505 for communicating information, and command selections to the processor 510. In another arrangement, the input device 530 has a touch screen display 535. The input device 530 can include any type of input device, such as a biometric sensor, a cursor control, such as a mouse, a trackball, or cursor direction keys, for communicating direction information and command selections to the processor 510 and for controlling cursor movement on the display 535.

In some arrangements, the computing system 500 may include a communications adapter 540, such as a networking adapter. Communications adapter 540 may be coupled to bus 505 and may be configured to enable communications with a computing or communications network 130 and/or other computing systems. In various illustrative arrangements, any type of networking configuration may be achieved using communications adapter 540, such as wired (e.g., via Ethernet), wireless (e.g., via Wi-Fi, Bluetooth), satellite (e.g., via GPS) pre-configured, ad-hoc, LAN, WAN.

According to various arrangements, certain processes that effectuate illustrative arrangements that are described herein can be achieved by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. In alternative arrangements, hard-wired circuitry may be used in place of or in combination with software instructions to implement illustrative arrangements. Thus, arrangements are not limited to any specific combination of hardware circuitry and software.

That is, although an example processing system has been described in FIG. 5, arrangements of the subject matter and the functional operations described in this specification can be carried out using other types of digital electronic circuitry, or in computer software (e.g., application, blockchain, distributed ledger technology) embodied on a tangible medium, firmware, or hardware, including the structures disclosed in this specification and their structural equivalents, or in combinations of one or more of them. Arrangements of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the arrangements of FIG. 5 as singular, stand-alone devices, one of ordinary skill in the art will appreciate that, in some arrangements, the computing system 500 may comprise virtualized systems and/or system resources. For example, in some arrangements, the computing system 500 may be a virtual switch, virtual router, virtual host, virtual server. In various arrangements, computing system 500 may share physical storage, hardware, and other resources with other virtual machines. In some arrangements, virtual resources of the network 130 (e.g., network 130 of FIG. 1) may include cloud computing resources such that a virtual resource may rely on distributed processing across more than one physical processor, distributed memory, etc.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A system, comprising:
a data protection computing system comprising at least one processing circuit having at least one processor coupled to at least one memory, the at least one processing circuit configured to:
receive an entity dataset comprising marketplace design preferences that define styling and designs of an online marketplace provided by a marketplace computing system, wherein the marketplace design preferences comprise styling information comprising one or more frameworks for styling a plurality of interactive elements;
generate and present, on a user device of a seller on the online marketplace, a first application user interface based on the marketplace design preferences, the first application user interface comprising the plurality of interactive elements associated with payment information of the seller, wherein the first application user interface is imported into a native application or a webpage provided by the marketplace computing system;
receive a preference in response to a selection of a first interactive element of the plurality of interactive elements, wherein the at least one processing circuit and the user device exchange information comprising the preference utilizing a first application programming interface (API) that restricts access to the user device of the seller by the marketplace computing system;

receive, from the marketplace computing system, transaction information regarding a transaction, wherein the at least one processing circuit and the marketplace computing system exchange information comprising the transaction information and the marketplace design preferences utilizing a second API;

identify the seller based on correlating the transaction information to the seller;

retrieve the preference based on identifying the seller; and automatically route a resource to the seller based on the retrieved preference.

2. The data protection system of claim 1, wherein the first application user interface is provided by the data protection system, and wherein the first application user interface is a component import of the native application or webpage hosted by the marketplace computing system.

3. The data protection system of claim 2, wherein the component import includes a software development kit.

4. The data protection system of claim 2, wherein the at least one processing circuit is further configured to:
establish a connection between the least one processing circuit and the user device, and wherein the first application user interface depicts at least one of payment card industry (PCI) data, banking data, or personal identifiable information (PII).

5. The data protection system of claim 1, wherein the at least one processing circuit is further configured to:
determine a response based on the entity dataset; and
determine a lending rate for an amount of funds based on the determined response.

6. The data protection system of claim 5, wherein the at least one processing circuit is further configured to:
update, on the user device, the first application user interface to include a second interactive element associated with an offer comprising the lending rate for the amount of funds.

7. The data protection system of claim 1, wherein the at least one processing circuit is further configured to:
determine a fee on the transaction;
deduct the fee from a payment of the transaction; and
store the fee in an account of the seller in a data protection database.

8. The data protection system of claim 1, wherein the at least one processing circuit is further configured to:
receive, from the user device, an activation condition, wherein the first application user interface is presented in response to receiving the activation condition;
receive, from the user device, a user identifier and a credential;
register the seller with the data protection system, wherein registering comprising generating a profile for the seller comprising the preference, the user identifier, the credential, and the activation condition; and
store the profile in a data protection database.

9. The data protection system of claim 1, wherein the styling information further comprises one or more libraries for styling the plurality of interactive elements, and wherein the at least one processing circuit is further configured to:
in response to receiving the preference, store, in a data protection database, the preference;
update the styling information to include the preference, wherein the updated styling information comprises an offer associated with a payment method; and generate and configure the first application user interface based on the one or more libraries or the one or more frameworks.

10. The data protection system of claim 1, wherein the at least one processing circuit is further configured to:
generate user analytics based on historical response information of the seller; and
present, on the user device, the user analytics.

11. A computer-implemented method for a digital marketplace add-in, the method comprising:
receiving, by one or more processing circuits, an entity dataset comprising marketplace design preferences that define styling and designs of an online marketplace provided by a marketplace computing system, wherein the marketplace design preferences comprise styling information comprising one or more frameworks for styling a plurality of interactive elements;
generating and presenting, by the one or more processing circuits on a user device of a seller on the online marketplace, a first application user interface based on the marketplace design preferences, the first application user interface comprising the plurality of interactive elements associated with payment information of the seller, wherein the first application user interface is imported into a native application or a webpage provided by the marketplace computing system;
receiving, by the one or more processing circuits, a preference in response to a selection of a first interactive element of the plurality of interactive elements, wherein the one or more processing circuits and the user device exchange information comprising the preference utilizing a first application programming interface (API) that restricts access to the user device of the seller by the marketplace computing system;
receiving, by the one or more processing circuits from the marketplace computing system, transaction information regarding a transaction, wherein the one or more processing circuits and the marketplace computing system exchange information comprising the transaction information and the marketplace design preferences utilizing a second API;
identifying, by the one or more processing circuits, the seller based on correlating the transaction information to the seller;
retrieving, by the one or more processing circuits, the preference based on identifying the seller; and
automatically routing, by the one or more processing circuits, a resource to the seller based on the retrieved preference.

12. The computer-implemented method of claim 11, wherein the first application user interface is provided by the one or more processing circuits, and wherein the first application user interface is a component import of the native application or native webpage hosted by the marketplace computing system.

13. The computer-implemented method of claim 12, further comprising:
establishing, by the one or more processing circuits, a connection between the one or more processing circuits and the user device, and wherein the first application user interface depicts at least one of payment card industry (PCI) data, banking data, or personal identifiable information (PII).

14. The computer-implemented method of claim 11, wherein the styling information further comprises one or more libraries for styling the plurality of interactive elements.

15. The computer-implemented method of claim 14, further comprising:
- in response to receiving the preference, storing, by the one or more processing circuits in a data protection database, the preference; and
- updating, by the one or more processing circuits, the styling information to include the preference, wherein the updated styling information comprises an offer associated with a payment method.

16. One or more non-transitory computer-readable storage media having instructions stored thereon that, when executed by at least one processing circuit, cause the at least one processing circuit to:
- receive an entity dataset comprising marketplace design preferences that define styling and designs of an online marketplace provided by a marketplace computing system, wherein the marketplace design preferences comprise styling information comprising one or more frameworks for styling a plurality of interactive elements;
- generate and present, on a user device of a seller on the online marketplace, a first application user interface based on the marketplace design preferences, the first application user interface comprising the plurality of interactive elements associated with payment information of the seller, wherein the first application user interface is imported into a native application or a webpage provided by the marketplace computing system;
- receive a preference in response to a selection of a first interactive element of the plurality of interactive elements, wherein the at least one processing circuit and the user device exchange information comprising the preference utilizing a first application programming interface (API) that restricts access to the user device of the seller by the marketplace computing system;
- receive, from the marketplace computing system, an indication of a transaction, wherein the at least one processing circuit and the marketplace computing system exchange information comprising transaction information and the marketplace design preferences utilizing a second API;
- identify the seller based on correlating the transaction information to the seller;
- retrieve the preference based on identifying the seller; and
- automatically route a resource to the seller based on the retrieved preference.

17. The one or more non-transitory computer-readable storage media of claim 16, wherein the first application user interface is provided by the at least one processing circuit, and wherein the first application user interface is a component import of the native application or the webpage hosted by the marketplace computing system.

18. The one or more non-transitory computer-readable storage media of claim 17, having additional instructions stored thereon that, when executed by the at least one processing circuit, cause the at least one processing circuit to:
- establish a connection between the at least one processing circuit and the user device, and wherein the first application user interface depicts at least one of payment card industry (PCI) data, banking data, or personal identifiable information (PII).

* * * * *